(12) United States Patent
Imai et al.

(10) Patent No.: US 6,583,602 B2
(45) Date of Patent: Jun. 24, 2003

(54) VEHICULAR POWER SUPPLY APPARATUS AND METHOD OF CONTROLLING THE SAME

(75) Inventors: Atsushi Imai, Anjo (JP); Tetsuya Nagata, Konan (JP); Hideji Yoshida, Hashima (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/135,699

(22) Filed: May 1, 2002

(65) Prior Publication Data

US 2002/0167291 A1 Nov. 14, 2002

(30) Foreign Application Priority Data

May 11, 2001 (JP) ........................................ 2001-141720
Jun. 4, 2001 (JP) ........................................ 2001-168570

(51) Int. Cl.[7] ........................ H01M 10/44; H01M 10/46
(52) U.S. Cl. ........................................ 320/118; 320/119
(58) Field of Search ............................. 320/103, 106, 320/107, 116, 118, 119, 122

(56) References Cited

U.S. PATENT DOCUMENTS 5,504,415 A * 4/1996 Podrazhansky et al.
5,764,027 A * 6/1998 Harvey
5,869,950 A * 2/1999 Hoffman, Jr. et al.
5,889,385 A * 3/1999 Podrazhansky et al.

FOREIGN PATENT DOCUMENTS

| JP | A 10-257682 | 9/1998 |
| JP | A 2000-354334 | 12/2000 |

* cited by examiner

Primary Examiner—Edward H. Tso
(74) Attorney, Agent, or Firm—Oliff & Berridge, PLC

(57) ABSTRACT

A lower battery block feeds low-voltage power to a low-voltage load. The lower battery block includes cells. At least one higher battery block is connected in series with the lower battery block, and cooperates with the lower battery block to feed high-voltage power to a high-voltage load. The higher battery block includes cells. A DC—DC converter transmits power from the higher battery block to the lower battery block. A controller detects an electric parameter of the lower battery block which relates to an average per-cell voltage in the lower battery block, and also an electric parameter of the higher battery block which relates to an average per-cell voltage in the higher battery block. The controller operates for controlling the DC—DC converter in response to the detected electric parameters to equalize the average per-cell voltage in the lower battery block and the average per-cell voltage in the higher battery block.

18 Claims, 18 Drawing Sheets

VEHICULAR POWER SUPPLY APPARATUS AND METHOD OF CONTROLLING THE SAME

BACKGROUND OF THE INVENTION

1. Field of the Invention

This invention relates to a multiple-output power supply apparatus for a vehicle. In addition, this invention relates to a method of controlling a multiple-output power supply apparatus for a vehicle. Furthermore, this invention relates to an apparatus for controlling a vehicular power generator or a vehicular alternator.

2. Description of the Related Art

Japanese patent application publication number P2000-354334A discloses a method of charging a combination battery which has cells coupled together in series. The combination battery has a negative terminal, a first positive terminal, and a second positive terminal. The negative terminal leads from the negative end of the series of the cells. The second positive terminal leads from the positive end of the series of the cells. The first positive terminal is connected with an intermediate tap (a junction) between neighboring two among the cells. Therefore, a voltage (a first output voltage) at the first positive terminal is lower than a voltage (a second output voltage) at the second positive terminal. A first load is connected between the negative terminal of the combination battery and the first positive terminal thereof. Thus, the first load is driven by the first output voltage. A second load is connected between the negative terminal of the combination battery and the second positive terminal thereof. Thus, the second load is driven by the second output voltage. A first power generator acts to charge all the cells in the combination battery. A second power generator acts to charge the cell between the negative terminal of the combination battery and the first positive terminal thereof. A DC—DC converter fed with power from the first power generator is used in correctively or supplementally charging the cell between the negative terminal of the combination battery and the first positive terminal thereof. Accordingly, it is possible to reduce differences in conditions among the cells in the combination battery. The reduction of the differences results in a longer life of the combination battery. The DC—DC converter can be fed with power from the combination battery.

Japanese patent application publication number 10-257682 discloses an apparatus for controlling a combination battery which has cells coupled together in series. The apparatus in Japanese application 10-257682 includes voltage control circuits and DC—DC converters. The voltage control circuits are connected with the cells, respectively. In addition, the voltage control circuits are connected with the DC—DC converters, respectively. The DC—DC converters are connected with the cells, respectively. The DC—DC converters are coupled to each other so that power can be transmitted thereamong. The voltage control circuits activate and deactivate the DC—DC converters in response to the voltages across the cells, respectively. When one of the cells becomes close to an overcharged state and hence the voltage thereacross exceeds a reference level, the voltage control circuit connected with the cell in question activates the related DC—DC converter by using power in the cell in question. The power is transmitted from the activated DC—DC converter to the other DC—DC converters before charging the cells connected with the other DC—DC converters. As a result, power is transmitted from the cell in question to the other cells. In such a way, the voltage control circuits and the DC—DC converters operate to equalize the charging states of the cells.

SUMMARY OF THE INVENTION

It is a first object of this invention to provide an improved multiple-output power supply apparatus for a vehicle.

It is a second object of this invention to provide an improved method of controlling a multiple-output power supply apparatus for a vehicle.

It is a third object of this invention to provide an improved apparatus for controlling a vehicular power generator (a vehicular alternator).

A first aspect of this invention provides a multiple-output power supply apparatus for a vehicle. The apparatus comprises a lower battery block for feeding low-voltage power to a low-voltage load, the lower battery block including cells; at least one higher battery block connected in series with the lower battery block and cooperating with the lower battery block to feed high-voltage power to a high-voltage load, the higher battery block including cells; power generator means for feeding power to a combination of the lower battery block and the higher battery block; a DC—DC converter for transmitting power from the higher battery block to the lower battery block; and controller means for detecting an electric parameter of the lower battery block which relates to an average per-cell voltage in the lower battery block, for detecting an electric parameter of the higher battery block which relates to an average per-cell voltage in the higher battery block, for comparing the detected electric parameter of the lower battery block and the detected electric parameter of the higher battery block, and for controlling the DC—DC converter to equalize the average per-cell voltage in the lower battery block and the average per-cell voltage in the higher battery block in response to a result of said comparing.

A second aspect of this invention is based on the first aspect thereof, and provides a multiple-output power supply apparatus further comprising a first cell equalizing circuit (a first cell voltage (SOC) balancer circuit) connected with the cells in the lower battery block and equalizing voltages across the cells in the lower battery block; and a second cell equalizing circuit (a second cell voltage (SOC) balancer circuit) connected with the cells in the higher battery block and equalizing voltages across the cells in the higher battery block.

A third aspect of this invention provides a method of controlling the multiple-output power supply apparatus of the second aspect thereof. The method comprises the steps of waiting until operation of the first cell equalizing circuit and operation of the second cell equalizing circuit are completed; and operating the DC—DC converter under a condition that operation of the first cell equalizing circuit and operation of the second cell equalizing circuit have been completed.

A fourth aspect of this invention provides a method of controlling the multiple-output power supply apparatus of the first aspect thereof. The method comprises the steps of detecting a first general parameter relating to one of (1) a SOC (state of charge) of the lower battery block, (2) the average per-cell voltage in the lower battery block, and (3) a current fed from the lower battery block to the low-voltage load; detecting a second general parameter relating to one of (1) a SOC of the higher battery block, (2) the average per-cell voltage in the higher battery block, and (3) a current fed from the higher battery block to the high-voltage load;

operating the DC—DC converter in cases where the detected first general parameter is smaller than the detected second general parameter by greater than a first threshold value; and maintaining operation of the DC—DC converter during a prescribed time interval after a difference between the detected first general parameter and the detected second general parameter becomes less than the first threshold value, or maintaining operation of the DC—DC converter until the difference between the detected first general parameter and the detected second general parameter becomes less than a second threshold value smaller than the first threshold value.

A fifth aspect of this invention provides a method of controlling the multiple-output power supply apparatus of the first aspect thereof. The method comprises the steps of detecting a first general parameter relating to one of (1) a SOC of the lower battery block, (2) the average per-cell voltage in the lower battery block, and (3) a current fed from the lower battery block to the low-voltage load; detecting a second general parameter relating to one of (1) a SOC of the higher battery block, (2) the average per-cell voltage in the higher battery block, and (3) a current fed from the higher battery block to the high-voltage load; and intermittently activating the DC—DC converter in cases where the detected first general parameter is smaller than the detected second general parameter by greater than a prescribed threshold value.

A sixth aspect of this invention is based on the fifth aspect thereof, and provides a method further comprising the step of continuously activating the DC—DC converter in cases where the detected first general parameter is smaller than the detected second general parameter by greater than a given threshold value, the given threshold value being greater than the prescribed threshold value.

A seventh aspect of this invention provides a method of controlling the multiple-output power supply apparatus of the first aspect thereof. The method comprises the steps of calculating a first apparatus operation efficiency which occurs if the DC—DC converter is continuously activated; calculating a second apparatus operation efficiency which occurs if the DC—DC converter is intermittently activated; and intermittently activating the DC—DC converter in cases where the calculated second apparatus operation efficiency is higher than the calculated first apparatus operation efficiency.

An eighth aspect of this invention provides a method of controlling the multiple-output power supply apparatus of the first aspect thereof. The method comprises the steps of determining whether or not a vehicle engine ignition switch is in its OFF position; and operating the DC—DC converter for every prescribed time interval per prescribed term in cases where the vehicle engine ignition switch continues to be in its OFF position.

A ninth aspect of this invention provides a method of controlling the multiple-output power supply apparatus of the first aspect thereof. The method comprises the steps of determining whether or not a speed of the vehicle is lower than a preset speed; setting a power output from the DC—DC converter to a first power level when the speed of the vehicle is lower than the preset speed; and setting the power output from the DC—DC converter to a second power level when the speed of the vehicle is not lower than the preset speed, the second power level being greater than the first power level.

A tenth aspect of this invention provides an apparatus for controlling a vehicular power generator. The apparatus comprises power storage means; a power generator for feeding power to the power storage means and an electric load; and controlling means for intermittently activating the power generator to approximately equalize an average power output from the power generator to a power consumed by the electric load.

An eleventh aspect of this invention is based on the tenth aspect thereof, and provides an apparatus further comprising means for detecting a rotational speed of a drive shaft of the power generator, and means for, during the intermittent activation of the power generator, controlling the power generator in response to the detected rotational speed of the drive shaft of the power generator on the basis of a predetermined relation among the rotational speed of the drive shaft of the power generator, a power generation efficiency of the power generator, and a power output from the power generator to provide an instantaneous power output corresponding to a high power generation efficiency.

A twelfth aspect of this invention is based on the tenth aspect thereof, and provides an apparatus wherein the controlling means comprises first sub-means for calculating a first total energy efficiency which occurs if the power generator is intermittently activated, second sub-means for calculating a second total energy efficiency which occurs if the power generator is continuously activated, third sub-means for intermittently activating the power generator when the first total energy efficiency is higher than the second total energy efficiency, and fourth sub-means for continuously activating the power generator when the second total energy efficiency is higher than the first total energy efficiency.

A thirteenth aspect of this invention is based on the twelfth aspect thereof, and provides an apparatus wherein the controlling means comprises means for calculating the first and second total energy efficiencies from a power generation efficiency of the power generator and charging and discharging efficiencies of the power storage means.

A fourteenth aspect of this invention is based on the tenth aspect thereof, and provides an apparatus wherein the controlling means comprises first sub-means for determining whether or not a vehicle is decelerating, second sub-means for operating the power generator at a maximum power output when the first sub-means determines that the vehicle is decelerating, and third sub-means for intermittently activating the power generator when the first sub-means determines that the vehicle is not decelerating.

A fifteenth aspect of this invention is based on the tenth aspect thereof, and provides an apparatus wherein the controlling means comprises first sub-means for detecting an acceleration of a vehicle, and second sub-means for deactivating the power generator when the detected acceleration of the vehicle exceeds a prescribed value.

A sixteenth aspect of this invention is based on the tenth aspect thereof, and provides an apparatus further comprising means for detecting a parameter relating to one of (1) a SOC of the power storage means and (2) a voltage across the power storage means, means for, during the intermittent activation of the power generator, continuously operating the power generator at a specified power output until the detected parameter rises to a first prescribed value, and means for, during the intermittent activation of the power generator, continuously deactivating the power generator until the detected parameter drops to a second prescribed value lower than the first prescribed value.

A seventeenth aspect of this invention is based on the tenth aspect thereof, and provides an apparatus wherein the power storage means comprises a lithium battery.

An eighteenth aspect of this invention is based on the tenth aspect thereof, and provides an apparatus wherein the power storage means comprises an electric double layer capacitor.

DETAILED DESCRIPTION OF THE INVENTION

Basic Embodiments

Figure 1:
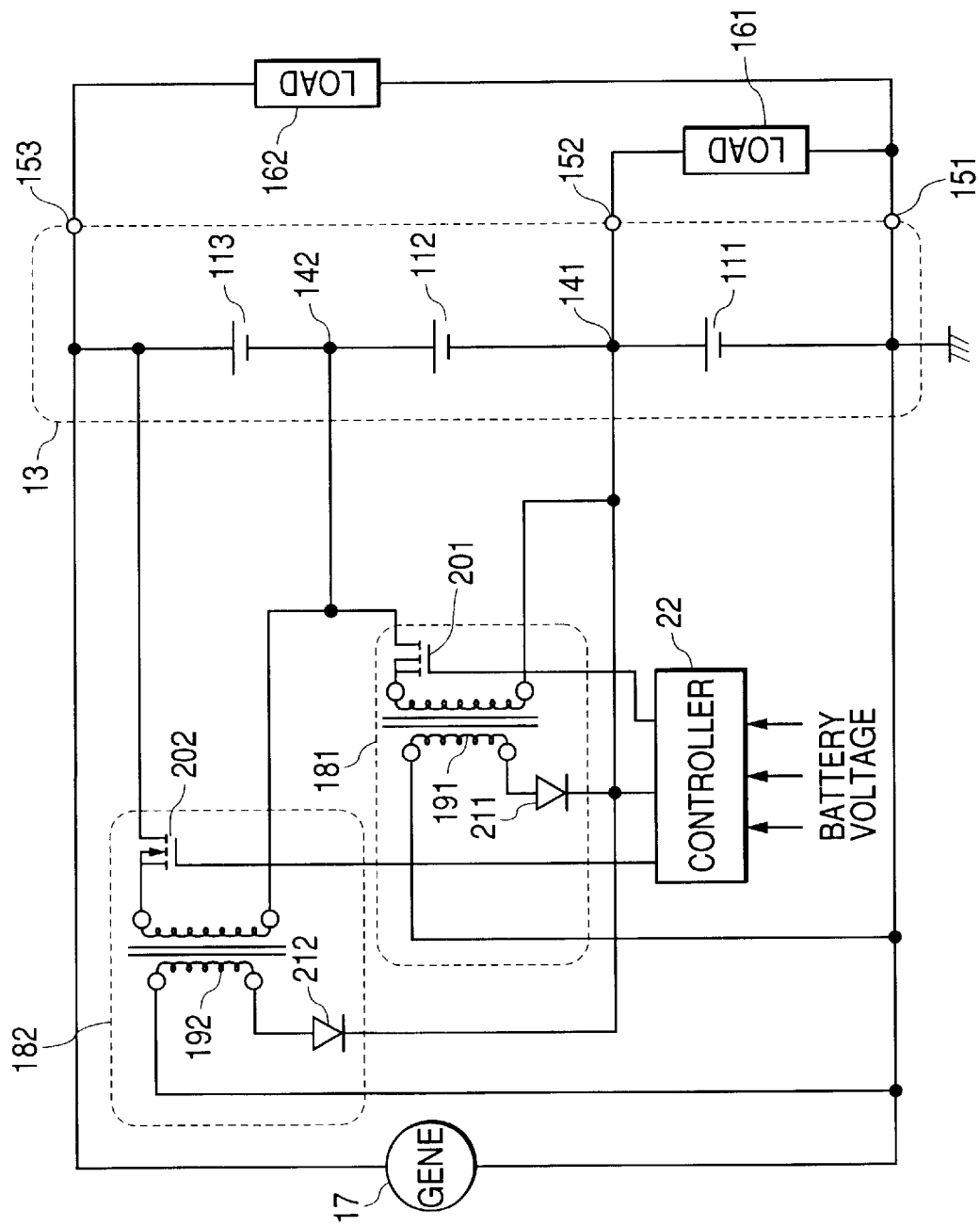
FIG. 1 is a diagram of a power supply apparatus of a multiple-voltage-output type according to a first specific embodiment of this invention.

According to a first basic embodiment of this invention, a multiple-output power supply apparatus for a vehicle comprises a lower battery block for feeding low-voltage power to a low-voltage load. The lower battery block includes cells. At least one higher battery block is connected in series with the lower battery block, and cooperates with the lower battery block to feed high-voltage power to a high-voltage load. The higher battery block includes cells. Power generator means operates for feeding power to a combination of the lower battery block and the higher battery block. A DC—DC converter operates for transmitting power from the higher battery block to the lower battery block. Controller means operates for detecting an electric parameter of the lower battery block which relates to an average per-cell voltage in the lower battery block, for detecting an electric parameter of the higher battery block which relates to an average per-cell voltage in the higher battery block, for comparing the detected electric parameter of the lower battery block and the detected electric parameter of the higher battery block, and for controlling the DC—DC converter to equalize the average per-cell voltage in the lower battery block and the average per-cell voltage in the higher battery block in response to a result of said comparing.

In the first basic embodiment of this invention, the DC—DC converter is of a one-way type, and has a relatively simple structure. Accordingly, it is possible to reduce the apparatus weight, the apparatus size, and the apparatus cost. Since the average per-cell voltage in the lower battery block and the average per-cell voltage in the higher battery block are equalized, it is possible to remove a variation among the amounts of power stored in the cells of the lower and higher battery blocks. Regarding control of the DC—DC converter, it is unnecessary to provide a sensor for detecting a current fed from the lower battery block to the low-voltage load. Each of the electric parameters of the lower and higher battery blocks may relate to a minimum cell voltage, an average SOC, or a minimum SOC.

A second basic embodiment of this invention is based on the first basic embodiment thereof. According to the second basic embodiment of this invention, a multiple-output power supply apparatus further comprises a first cell equalizing circuit (a first cell voltage (SOC) balancer circuit) connected with the cells in the lower battery block and equalizing the voltages across the cells in the lower battery block, and a second cell equalizing circuit (a second cell voltage (SOC) balancer circuit) connected with the cells in the higher battery block and equalizing the voltages across the cells in the higher battery block.

In the second embodiment of this invention, the average per-cell voltage in the lower battery block and the average per-cell voltage in the higher battery block are equalized by controlling the DC—DC converter. Furthermore, the voltages across the cells in the lower battery block are equalized by the first cell equalizing circuit, and the voltages across the cells in the higher battery block are equalized by the second cell equalizing circuit. Accordingly, it is possible to more reliably and accurately equalize the power storing conditions of the cells in the lower and higher battery blocks. The first and second cell equalizing circuits assist the DC—DC converter. Therefore, it is possible to reduce heat generation by the DC—DC converter.

According to a third basic embodiment of this invention, a method of controlling the multiple-output power supply apparatus of the second basic embodiment of this invention comprises the steps of waiting until operation of the first cell equalizing circuit and operation of the second cell equalizing circuit are completed; and operating the DC—DC converter under a condition that operation of the first cell equalizing circuit and operation of the second cell equalizing circuit have been completed. It is possible to reduce a variation among the power storing conditions of the cells in the lower and higher battery blocks.

According to a fourth basic embodiment of this invention, a method of controlling the multiple-output power supply apparatus of the first basic embodiment of this invention comprises the steps of detecting a first general parameter relating to one of (1) a SOC of the lower battery block, (2) the average per-cell voltage in the lower battery block, and (3) a current fed from the lower battery block to the low-voltage load; detecting a second general parameter relating to one of (1) a SOC of the higher battery block, (2) the average per-cell voltage in the higher battery block, and (3) a current fed from the higher battery block to the high-voltage load; operating the DC—DC converter in cases where the detected first general parameter is smaller than the detected second general parameter by greater than a first threshold value; and maintaining operation of the DC—DC converter during a prescribed time interval after a difference between the detected first general parameter and the detected second general parameter becomes less than the first threshold value, or maintaining operation of the DC—DC converter until the difference between the detected first general parameter and the detected second general parameter becomes less than a second threshold value smaller than the first threshold value.

In the fourth basic embodiment of this invention, when the difference in electric parameter (for example, load drive current, average per-cell voltage, or SOC) between the lower battery block and the higher battery block is greater than a reference value, the DC—DC converter is exposed to hysteresis drive. Thereby, the DC—DC converter can be intermittently activated. The intermittent activation of the DC—DC converter suppresses a drop in efficiency.

According to a fifth basic embodiment of this invention, a method of controlling the multiple-output power supply apparatus of the first basic embodiment of this invention comprises the steps of detecting a first general parameter relating to one of (1) a SOC of the lower battery block, (2) the average per-cell voltage in the lower battery block, and (3) a current fed from the lower battery block to the low-voltage load; detecting a second general parameter relating to one of (1) a SOC of the higher battery block, (2) the average per-cell voltage in the higher battery block, and (3) a current fed from the higher battery block to the high-voltage load; and intermittently activating the DC—DC converter in cases where the detected first general parameter is smaller than the detected second general parameter by greater than a prescribed threshold value.

In the fifth basic embodiment of this invention, when the difference in electric parameter (for example, load drive current, average per-cell voltage, or SOC) between the lower battery block and the higher battery block is greater than the prescribed threshold value, the DC—DC converter is intermittently activated. The intermittent activation of the DC—DC converter suppresses a drop in efficiency.

A sixth basic embodiment of this invention is based on the fifth basic embodiment thereof. According to the sixth basic embodiment of this invention, a method further comprises the step of continuously activating the DC—DC converter in cases where the detected first general parameter is smaller than the detected second general parameter by greater than a given threshold value. The given threshold value is greater than the prescribed threshold value.

In the sixth basic embodiment of this invention, when the difference in SOC or its variation rate between the lower battery block and the higher battery block is greater than a reference value (the given threshold value), the DC—DC converter is continuously activated. Thus, the DC—DC converter can be small in size.

According to a seventh basic embodiment of this invention, a method of controlling the multiple-output power supply apparatus of the first basic embodiment of this invention comprises the steps of calculating a first apparatus operation efficiency which occurs if the DC—DC converter is continuously activated; calculating a second apparatus operation efficiency which occurs if the DC—DC converter is intermittently activated; and intermittently activating the DC—DC converter in cases where the calculated second apparatus operation efficiency is higher than the calculated first apparatus operation efficiency.

In the seventh basic embodiment of this invention, the continuous activation of the DC—DC converter includes continuous drive of the DC—DC converter at a partial load. The partial-load continuous drive includes operation of the DC—DC converter under PWM-based duty control. Here, PWM is short for pulse width modulation. During the intermittent activation of the DC—DC converter, a current outputted from the DC—DC converter is repetitively blocked. As previously mentioned, in the case where the calculated second apparatus operation efficiency is higher than the calculated first apparatus operation efficiency, the DC—DC converter is intermittently activated. Accordingly, it is possible to enhance the apparatus operation efficiency over an entire load range. Provided that the charging and discharging efficiencies of the lower and higher battery blocks are considered, the apparatus operation efficiency can be further enhanced.

According to an eighth basic embodiment of this invention, a method of controlling the multiple-output power supply apparatus of the first basic embodiment of this invention comprises the steps of determining whether or not a vehicle engine ignition switch is in its OFF position; and operating the DC—DC converter for every prescribed time interval per prescribed term in cases where the vehicle engine ignition switch continues to be in its OFF position. It is possible to improve the effective efficiency of the DC—DC converter when the vehicle engine ignition switch is in its OFF position.

According to a ninth basic embodiment of this invention, a method of controlling the multiple-output power supply apparatus of the first basic embodiment of this invention comprises the steps of determining whether or not a speed of the vehicle is lower than a preset speed; setting a power output from the DC—DC converter to a first power level when the speed of the vehicle is lower than the preset speed; and setting the power output from the DC—DC converter to a second power level when the speed of the vehicle is not lower than the preset speed. The second power level is greater than the first power level. It is possible to prevent the DC—DC converter from overheating when the speed of the vehicle is relatively low.

According to a tenth basic embodiment of this invention, an apparatus for controlling a vehicular power generator comprises power storage means; a power generator for feeding power to the power storage means and an electric load; and controlling means for intermittently activating the power generator to approximately equalize an average power output from the power generator to a power consumed by the electric load. The intermittent activation of the power generator enhances an effective efficiency thereof and also a total apparatus energy efficiency.

An eleventh basic embodiment of this invention is based on the tenth basic embodiment thereof. According to the eleventh basic embodiment of this invention, an apparatus further comprises means for detecting a rotational speed of a drive shaft of the power generator, and means for, during the intermittent activation of the power generator, controlling the power generator in response to the detected rotational speed of the drive shaft of the power generator on the basis of a predetermined relation among the rotational speed of the drive shaft of the power generator, a power generation efficiency of the power generator, and a power output from the power generator to provide an instantaneous power output corresponding to a high power generation efficiency.

Generally, the relation between the power generation efficiency of the power generator and the power output thereof depends on the rotational speed of the drive shaft of the power generator. In the eleventh basic embodiment of this invention, the power generator is operated at a power output corresponding to a high power generation efficiency (or a maximum power generation efficiency). Accordingly, the power generator can be driven in efficiency-optimizing conditions regardless of the power consumed by the electric load and a variation in rotational speed of the drive shaft of the power generator.

A twelfth basic embodiment of this invention is based on the tenth basic embodiment thereof. According to the twelfth basic embodiment of this invention, an apparatus is designed so that the controlling means comprises first sub-means for calculating a first total energy efficiency which occurs if the power generator is intermittently activated, second sub-means for calculating a second total energy efficiency which occurs if the power generator is continuously activated, third sub-means for intermittently activating the power generator when the first total energy efficiency is higher than the second total energy efficiency, and fourth sub-means for continuously activating the power generator when the second total energy efficiency is higher than the first total energy efficiency. It is possible to attain a high effective total energy efficiency.

A thirteenth basic embodiment of this invention is based on the twelfth basic embodiment thereof. According to the thirteenth basic embodiment of this invention, an apparatus is designed so that the controlling means comprises means for calculating the first and second total energy efficiencies from a power generation efficiency of the power generator and charging and discharging efficiencies of the power storage means. Since the charging and discharging efficiencies of the power storage means are considered, the apparatus energy efficiency can be enhanced.

A fourteenth basic embodiment of this invention is based on the tenth basic embodiment thereof. According to the fourteenth basic embodiment of this invention, an apparatus is designed so that the controlling means comprises first sub-means for determining whether or not a vehicle is decelerating, second sub-means for operating the power generator at a maximum power output when the first sub-means determines that the vehicle is decelerating, and third sub-means for intermittently activating the power generator when the first sub-means determines that the vehicle is not decelerating. The power generator can be effectively used in braking the vehicle, and the apparatus energy efficiency can be enhanced.

A fifteenth basic embodiment of this invention is based on the tenth basic embodiment thereof. In the fifteenth basic embodiment of this invention, the controlling means comprises first sub-means for detecting an acceleration of a vehicle, and second sub-means for deactivating the power generator when the detected acceleration of the vehicle exceeds a prescribed value. Since the power generator is deactivated when the detected acceleration of the vehicle exceeds the prescribed value, vehicle accelerating performances can be improved.

A sixteenth basic embodiment of this invention is based on the tenth basic embodiment thereof. According to the sixteenth basic embodiment of this invention, an apparatus further comprises means for detecting a parameter relating to one of (1) a SOC of the power storage means and (2) a voltage across the power storage means, means for, during the intermittent activation of the power generator, continuously operating the power generator at a specified power output until the detected parameter rises to a first prescribed value, and means for, during the intermittent activation of the power generator, continuously deactivating the power generator until the detected parameter drops to a second prescribed value lower than the first prescribed value. The parameter used for the determination as the continuous operation of the power generator may relate to the voltage across the power storage means while the parameter used for the determination as to the continuous deactivation of the power generator may relate to the SOC of the power storage means. Alternatively, the parameter used for the determination as the continuous operation of the power generator may relate to the SOC of the power storage means while the parameter used for the determination as to the continuous deactivation of the power generator may relate to the voltage across the power storage means.

A seventeenth basic embodiment of this invention is based on the tenth basic embodiment thereof. According to the seventeenth basic embodiment of this invention, an apparatus is designed so that the power storage means comprises a lithium battery. Since the lithium battery has small charging and discharging losses, the apparatus energy efficiency can be enhanced.

An eighteenth basic embodiment of this invention is based on the tenth basic embodiment thereof. According to the eighteenth basic embodiment of this invention, an apparatus is designed so that the power storage means comprises an electric double layer capacitor. Since the electric double layer capacitor has small charging and discharging losses, the apparatus energy efficiency can be enhanced.

First Specific Embodiment

FIG. 1 shows a power supply apparatus of a multiple-voltage-output type according to a first specific embodiment of this invention. The power supply apparatus in FIG. 1 is designed for a vehicle driven by an engine. The power supply apparatus in FIG. 1 includes a combination battery 13 composed of lead acid batteries 111, 112, and 113 coupled together in series in that order. The combination battery 13 is connected with a low-voltage load (an electric load) 161 and a high-voltage load (an electric load) 162 to feed power to them. Two DC—DC converters 181 and 182 are connected with the combination battery 13. A power generator or an alternator 17 containing a rectifier is connected with the combination battery 13. A controller 22 is connected with the DC—DC converters 181 and 182.

The combination battery 13 has a negative terminal 151, a first positive terminal 152, and a second positive terminal 153 referred to as a lower side terminal, an intermediate terminal, and a higher side terminal respectively. The lower side terminal 151 leads from the negative end of the series of the lead acid batteries 111, 112, and 113. The intermediate terminal 152 leads from the junction between the lead acid batteries 111 and 112. The higher side terminal 153 leads from the positive end of the series of the lead acid batteries 111, 112, and 113. Each of the lead acid batteries 111, 112, and 113 generates a voltage of about 12 V on average. Thus, the voltage between the intermediate terminal 152 and the negative terminal 151 is equal to about 12 V. The low-voltage load 161 is connected between the intermediate terminal 152 and the negative terminal 151. The low-voltage load 161 includes, for example, an electronic control unit (ECU), an interior light, and an audio device. The voltage between the second positive terminal 153 and the negative terminal 151 is equal to about 36.0 V. The high-voltage load 162 is connected between the second positive terminal 153 and the negative terminal 151. The high-voltage load 162 includes, for example, a power steering motor, an air conditioner compressor, and a water pump. The power generator 17 is driven by the engine. The power generator 17 is connected between the positive and negative ends of the series of the lead acid batteries 111, 112, and 113 in the combination battery 13. The power generator 17 acts to charge the combination battery 13. In addition, the power generator 17 can feed power to the low-voltage load 161 and the high-voltage load 162.

The DC—DC converter 181 includes a switching element 201, a transformer 191, and a diode 211. The switching element 201 includes, for example, a MOS-FET. The transformer 191 has a primary winding and a secondary winding. One end of the primary winding is connected with the junction 141 between the lead acid batteries 111 and 112. The other end of the primary winding is connected via the switching element 201 to the junction between the lead acid batteries 112 and 113. One end of the secondary winding is connected via the diode 211 to the junction 141 between the lead acid batteries 111 and 112. The other end of the secondary winding is connected with the negative end of the series of the lead acid batteries 111, 112, and 113. When the switching element 201 is alternately changed between an ON state and an OFF state, the DC—DC converter 181 is activated so that power can be transmitted from the lead acid battery 112 to the lead acid battery 111. On the other hand, when the switching element 201 remains in its OFF state, the DC—DC converter 181 continues to be inactive. The switching element 201 has a control terminal connected with the controller 22. The switching element 201 can be controlled by the controller 22.

The DC—DC converter 182 includes a switching element 202, a transformer 192, and a diode 212. The switching element 202 includes, for example, a MOS-FET. The transformer 192 has a primary winding and a secondary winding. One end of the primary winding is connected with the junction 142 between the lead acid batteries 112 and 113. The other end of the primary winding is connected via the switching element 202 to the positive end of the series of the lead acid batteries 111, 112, and 113. One end of the secondary winding is connected via the diode 212 to the junction 141 between the lead acid batteries 111 and 112. The other end of the secondary winding is connected with the negative end of the series of the lead acid batteries 111, 112, and 113. When the switching element 202 is alternately changed between an ON state and an OFF state, the DC—DC converter 182 is activated so that power can be transmitted from the lead acid battery 113 to the lead acid battery 111. On the other hand, when the switching element 202 remains in its OFF state, the DC—DC converter 182 continues to be inactive. The switching element 202 has a control terminal connected with the controller 22. The switching element 202 can be controlled by the controller 22.

During operation of the power supply apparatus in FIG. 1, power feed to the high-voltage load 162 is implemented by the lead acid batteries 111, 112, and 113, and the power generator 17. On the other hand, power feed to the low-voltage load 161 is implemented by the lead acid battery 111. Also, power can be fed to the low-voltage load 161 from the lead acid battery 112 via the DC—DC converter 181. In addition, power can be fed to the low-voltage load 161 from the lead acid battery 113 via the DC—DC converter 182.

The controller 22 is connected with the negative and positive ends of the series of the lead acid batteries 111, 112, and 113, the junction 141 between the lead acid batteries 111 and 112, and the junction 142 between the lead acid batteries 112 and 113. Thus, the voltage across the lead acid battery 111, the voltage across the lead acid battery 112, and the voltage across the lead acid battery 113 are applied to the controller 22.

The controller 22 includes, for example, a microcomputer having a combination of an input/output circuit, a CPU, a ROM, and a RAM. The controller 22 operates in accordance with a program stored in the ROM. The program is designed to enable the controller 22 to implement operation steps mentioned hereafter. The controller 22 monitors the voltages across the lead acid batteries 111, 112, and 113, and compares them with each other. The controller 22 controls the switching elements 201 and 202 in response to the results of the comparison so as to equalize the voltages across the lead acid batteries 111, 112, and 113. In other words, the controller 22 functions to equalize the amounts of power stored in the lead acid batteries 111, 112, and 113. For example, when the voltage across the lead acid battery 112 becomes higher than the voltage across the lead acid battery 111, the controller 22 controls the switching element 201 to activate the DC—DC converter 181. The activation of the DC—DC converter 181 causes the transmission of power from the lead acid battery 112 to the lead acid battery 111. As a result of the power transmission, the voltage across the lead acid battery 111 rises while the voltage across the lead acid battery 112 drops. Therefore, the voltages across the lead acid batteries 111 and 112 are equalized. When the voltage across the lead acid battery 113 becomes higher than the voltage across the lead acid battery 111, the controller 22 controls the switching element 202 to activate the DC—DC converter 182. The activation of the DC—DC converter 182 causes the transmission of power from the lead acid battery 113 to the lead acid battery 111. As a result of the power transmission, the voltage across the lead acid battery 111 rises while the voltage across the lead acid battery 113 drops. Therefore, the voltages across the lead acid batteries 111 and 113 are equalized.

Alternatively, the controller 22 may include voltage comparators for comparing the voltages across the lead acid batteries 111, 112, and 113 with each other, and pulse signal generators for outputting pulse signals to the switching elements 201 and 202 in response to the output signals of the voltage comparators.

It should be noted that the lead acid batteries 111, 112, and 113 may be replaced by electric double layer capacitors or lithium ion batteries.

Second Specific Embodiment

Figure 2:
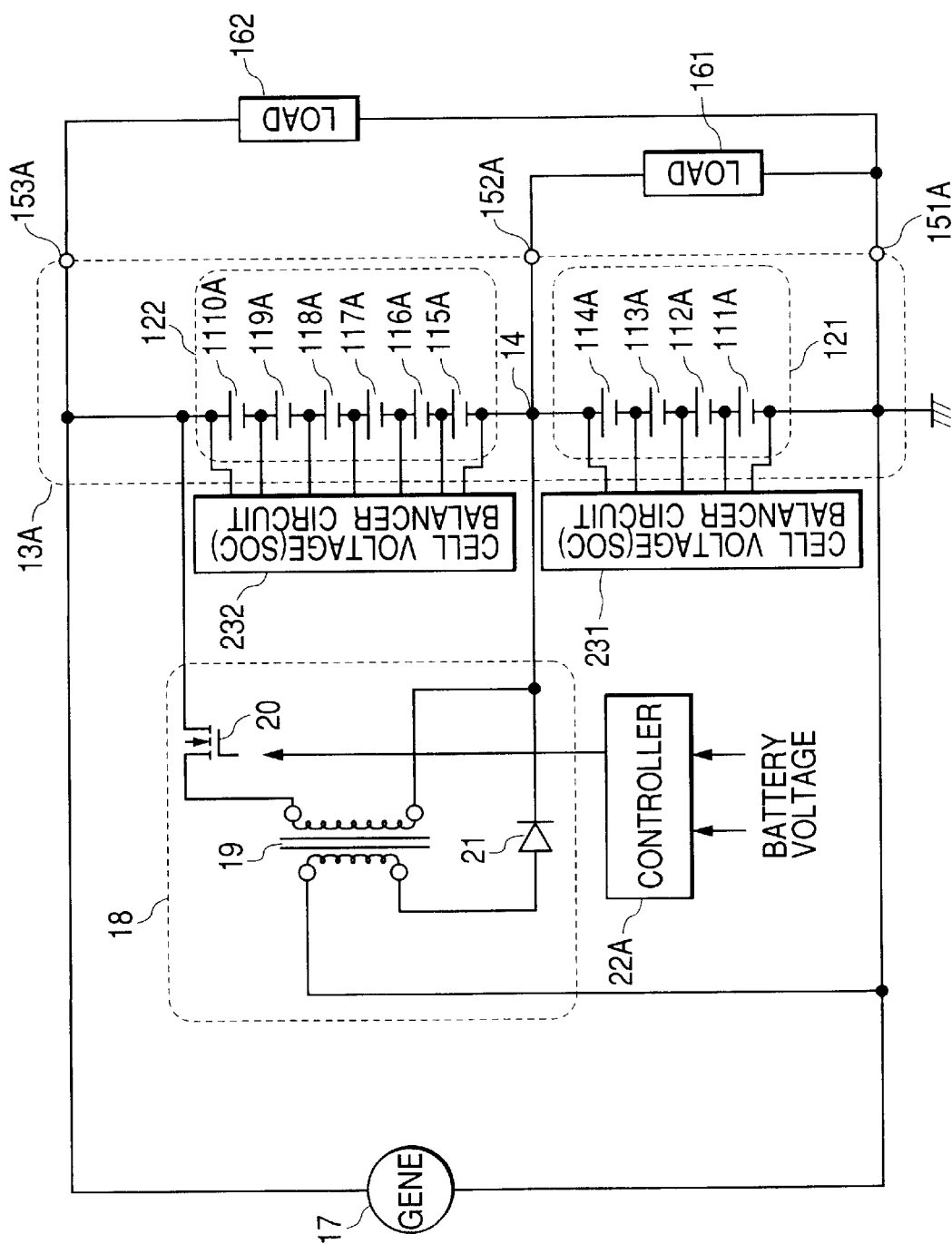
FIG. 2 is a diagram of a power supply apparatus of a multiple-voltage-output type according to a second specific embodiment of this invention.

FIG. 2 shows a power supply apparatus of a multiple-voltage-output type according to a second specific embodiment of this invention. The power supply apparatus in FIG. 2 is designed for a vehicle driven by an engine. The power supply apparatus in FIG. 2 includes a combination battery 13A composed of lithium batteries (lithium cells or lithium ion cells) 111A, 112A, 113A, 114A, 115A, 116A, 117A, 118A, 119A, and 1110A coupled together in series in that order. The combination battery 13A is connected with a low-voltage load (an electric load) 161 and a high-voltage load (an electric load) 162 to feed power to them. A DC—DC converter 18 is connected with the combination battery 13A. A power generator or an alternator 17 containing a rectifier is connected with the combination battery 13A. The power generator 17 is driven by the engine. A controller 22A is connected with the DC—DC converter 18.

The combination battery 13A includes a lower battery block 121 and a higher battery block 122 connected in series. The lithium cells 111A–114A compose the lower battery block 121. The lithium cells 115A–119A and 1110A compose the higher battery block 122. The combination battery 13A has a negative terminal 151A, a first positive terminal 152A, and a second positive terminal 153A referred to as a lower side terminal, an intermediate terminal, and a higher side terminal respectively. The lower side terminal 151A leads from the negative end of the series of the lithium cells 111A–119A and 1110A. The intermediate terminal 152A leads from the junction 14 between the lower battery block 121 and the higher battery block 122 (that is, the junction between the lithium cells 114A and 115A). The higher side terminal 153A leads from the positive end of the series of the lithium cells 111A–119A and 1110A. Each of the lithium cells 111A–119A and 1110A generates a voltage of about 3.6 V on average. Thus, the voltage between the intermediate terminal 152A and the negative terminal 151A is equal to about 14.4 V. The low-voltage load 161 is connected between the intermediate terminal 152A and the negative terminal 151A. The voltage between the second positive terminal 153A and the negative terminal 151A is equal to about 36.0 V. The high-voltage load 162 is connected between the second positive terminal 153A and the negative terminal 151A. The power generator 17 is connected between the positive and negative ends of the series of the lithium cells 111A–119A and 1110A in the combination battery 13A. The power generator 17 acts to charge the combination battery 13A. In addition, the power generator 17A can feed power to the low-voltage load 161 and the high-voltage load 162.

A cell voltage (SOC) balancer circuit (a cell equalizing circuit) 231 is connected with the positive and negative terminals of the lithium cells 111A–114A in the lower battery block 121. The cell voltage (SOC) balancer circuit 231 functions to equalize the voltages across the lithium cells 111A–114A. The cell voltage (SOC) balancer circuit 231 is powered by the lower battery block 121. The cell voltage (SOC) balancer circuit 231 is located near the lower battery block 121. A cell voltage (SOC) balancer circuit (a cell equalizing circuit) 232 is connected with the positive and negative terminals of the lithium cells 115A–119A and 1110A in the higher battery block 122. The cell voltage (SOC) balancer circuit 232 functions to equalize the voltages across the lithium cells 115A–119A and 1110A. The cell voltage (SOC) balancer circuit 232 is powered by the higher battery block 122. The cell voltage (SOC) balancer circuit 232 is located near the higher battery block 122.

The DC—DC converter 18 includes a switching element 20, a transformer 19, and a diode 21. The switching element 20 includes, for example, a MOS-FET. The transformer 19 has a primary winding and a secondary winding. One end of the primary winding is connected with the junction 14 between the lower battery block 121 and the higher battery block 122 (that is, the junction between the lithium cells 114A and 115A). The other end of the primary winding is connected via the switching element 20 to the positive end of the series of the lithium cells 111A–119A and 1110A. One end of the secondary winding is connected via the diode 21 to the junction 14 between the lower battery block 121 and the higher battery block 122 (that is, the junction between the lithium cells 114A and 115A). The other end of the secondary winding is connected with the negative end of the series of the lithium cells 111A–119A and 1110A. When the switching element 20 is alternately changed between an ON state and an OFF state, the DC—DC converter 18 is activated so that power can be transmitted from the higher battery block 122 to the lower battery block 121. On the other hand, when the switching element 20 remains in its OFF state, the DC—DC converter 18 continues to be inactive. The switching element 20 has a control terminal connected with the controller 22A. The switching element 20 can be controlled by the controller 22A.

During operation of the power supply apparatus in FIG. 2, power feed to the high-voltage load 162 is implemented by the lower battery block 121, the higher battery block 122, and the power generator 17. On the other hand, power feed to the low-voltage load 161 is implemented by the lower battery block 121. Also, power can be fed to the low-voltage load 161 from the higher battery block 122 via the DC—DC converter 18.

The controller 22A is connected with the negative and positive ends of the series of the lithium cells 111A–119A and 1110A, and the junction 14 between the lower battery block 121 and the higher battery block 122. Thus, the voltage across the lower battery block 121 and the voltage across the higher battery block 122 are applied to the controller 22A.

The controller 22A includes, for example, a microcomputer having a combination of an input/output circuit, a CPU, a ROM, and a RAM. The controller 22A operates in accordance with a program stored in the ROM. The program is designed to enable the controller 22A to implement operation steps mentioned hereafter. The controller 22A monitors the voltage across the lower battery block 121 and the voltage across the higher battery block 122. The controller 22A calculates the ratio between the monitored voltage across the lower battery block 121 and the monitored voltage across the higher battery block 122. The controller 22A compares the calculated ratio with a reference ratio "4:6" or "2:3". The controller 22A controls the switching element 20 in response to the result of the comparison so that the ratio between the voltage across the lower battery block 121 and the voltage across the higher battery block 122 will be equal to the reference ratio.

Figure 3:
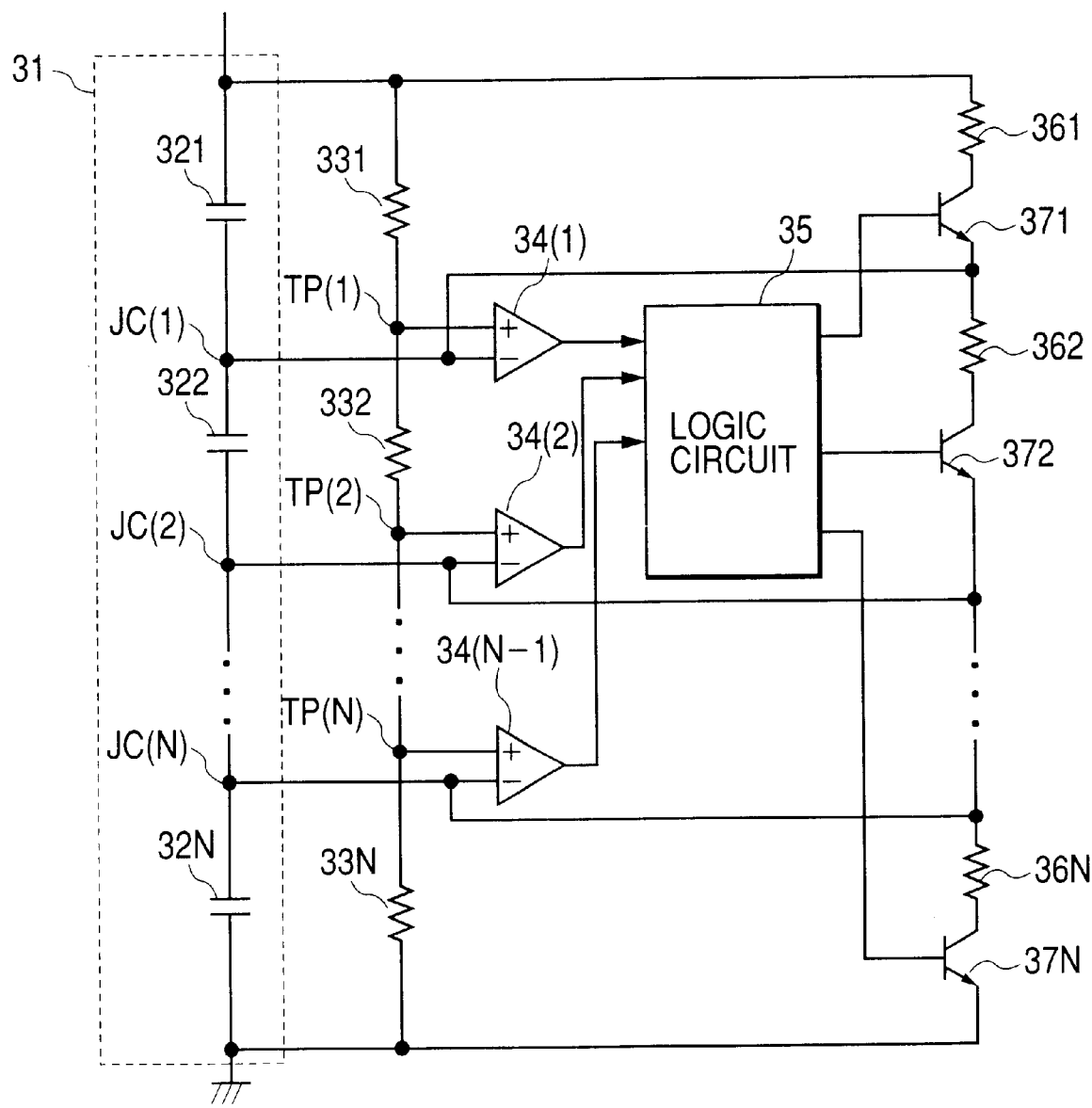
FIG. 3 is a diagram of a cell voltage (SOC) balancer circuit which can be used as each of cell voltage (SOC) balancer circuits in FIG. 2.

The cell voltage (SOC) balancer circuits 231 and 232 are similar in structure. FIG. 3 shows a cell voltage (SOC) balancer circuit which can be used as the cell voltage (SOC) balancer circuit 231 or 232. In FIG. 3, a battery block 31 is composed of cells 321, 322, . . . , and 32N coupled together in series in that order. The cells 321–32N correspond to the cells 111A–114A in the lower battery block 121 in FIG. 2 or the cells 115A–119A and 1110A in the higher battery block 122 in FIG. 2. The cell voltage (SOC) balancer circuit in FIG. 3 includes resistors 331, 332, . . . , and 33N connected in series in that order. The number of the resistors 331, 332, . . . , and 33N is equal to that of the cells 321, 322, . . . , and 32N. The resistances of the resistors 331, 332, . . . , and 33N are equal to each other. The series of the resistors 331, 332, . . . , and 33N is connected across the battery block 31. The series of the resistors 331, 332, . . . , and 33N constitutes a circuit for dividing the voltage across the battery block 31. The taps TP(1), TP(2), . . . , and TP(N−1) among the resistors 331, 332, . . . , and 33N correspond to the respective junctions JC(1), JC(2), . . . , and JC(N−1) among the cells 321, 322, . . . , and 32N.

The cell voltage (SOC) balancer circuit in FIG. 3 further includes comparators 34(1), 34(2), . . . , and 34(N−1), a logic circuit 35, switches 371, 372, . . . , and 37N, and resistors 361, 362, . . . , and 36N. The cell 321, the resistor 361, and the switch 371 are connected in a loop. Also, the cell 322, the resistor 362, and the switch 372 are connected in a loop. Similarly, the other cells 323–32N, the other resistors 363–36N, and the switches 373–37N are connected in loops. The switches 371–37N have control terminals connected with the logic circuit 35. The switches 371–37N are controlled by the logic circuit 35. The comparators 34(1), 34(2), . . . , and 34(N−1) are assigned to the inter-cell junctions JC(1), JC(2), . . . , and JC(N−1), respectively. In addition, the comparators 34(1), 34(2), . . . , and 34(N−1) are assigned to the inter-resistor taps TP(1), TP(2), . . . , and TP(N−1), respectively. The comparator 34(1) compares the voltage at the inter-cell junction JC(1) and the voltage at the inter-resistor tap TP(1). The comparator 34(1) outputs a binary signal to the logic circuit 35 which depends on the comparison result. Also, the comparator 34(2) compares the voltage at the inter-cell junction JC(2) and the voltage at the inter-resistor tap TP(2). The comparator 34(2) outputs a binary signal to the logic circuit 35 which depends on the comparison result. Similarly, each of the other comparators 34(3)–34(N−1) compares the voltage at the related inter-cell junction and the voltage at the related inter-resistor tap, and outputs a binary signal to the logic circuit 35 which depends on the comparison result. In response to the output signals from the comparators 34(1)–34(N−1), the logic circuit 35 detects one or ones among the cells 321, 322, . . . , and 32N whose voltages are higher than a mean level (or a desired level). The logic circuit 35 closes one or ones among the switches 371–37N which correspond to the higher-voltage cells. As a result, power of each of the higher-voltage cells is consumed by corresponding one of the resistors 361–36N.

Therefore, the voltage of each of the higher-voltage cells is dropped to the mean level (or the desired level). Accordingly, the voltages across the cells 321, 322, . . . , and 32N are equalized.

It should be noted that the lithium cells 111A–119A and 1110A may be replaced by electric double layer capacitors.

Third Specific Embodiment

Figure 4:
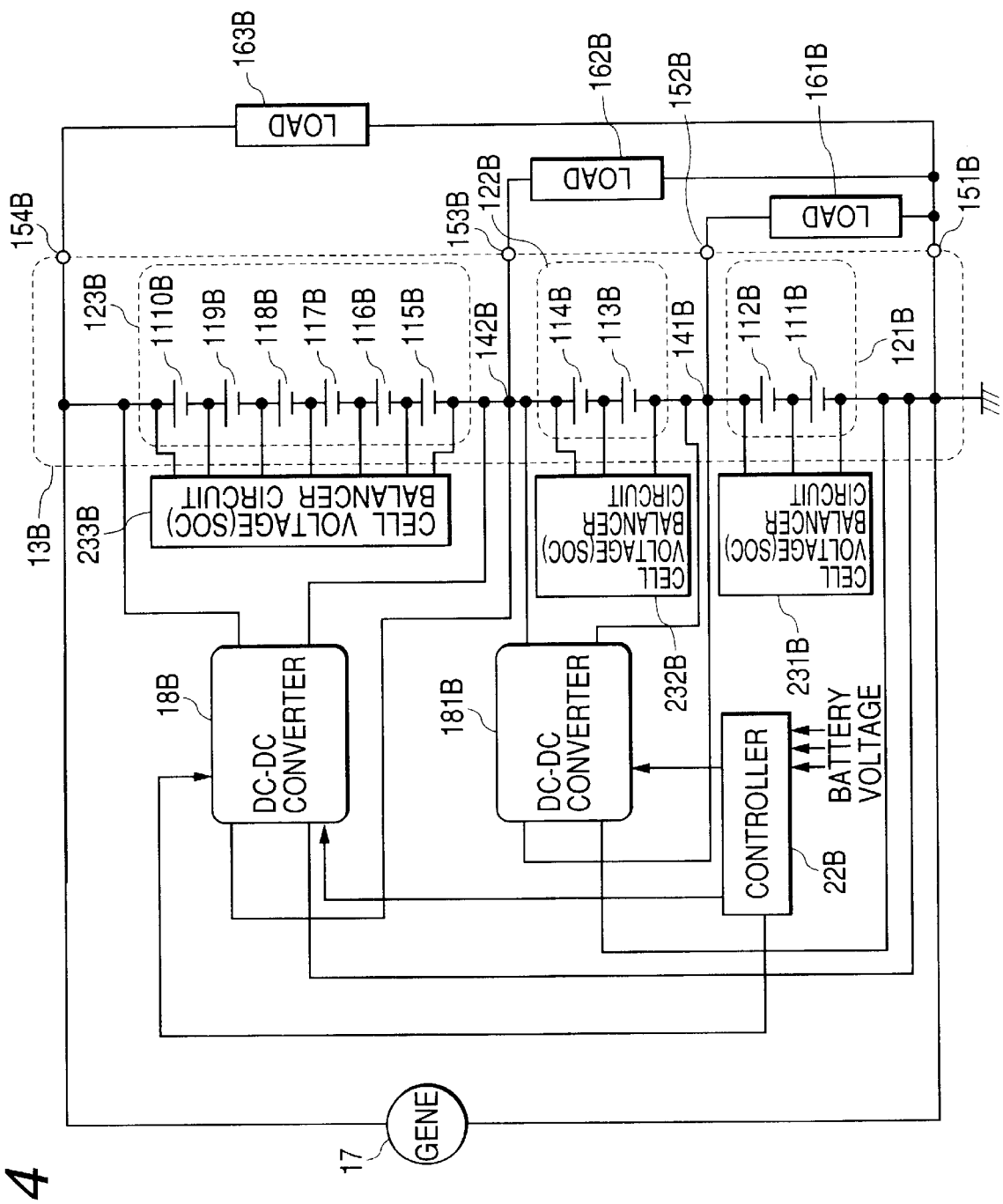
FIG. 4 is a diagram of a power supply apparatus of a multiple-voltage-output type according to a third specific embodiment of this invention.

FIG. 4 shows a power supply apparatus of a multiple-voltage-output type according to a third specific embodiment of this invention. The power supply apparatus in FIG. 4 is designed for a vehicle driven by an engine. The power supply apparatus in FIG. 4 includes a combination battery 13B composed of lithium batteries (lithium cells or lithium ion cells) 111B, 112B, 113B, 114B, 115B, 116B, 117B, 118B, 119B, and 1110B coupled together in series in that order. The combination battery 13B is connected with a low-voltage load (an electric load) 161B, an intermediate-voltage load (an electric load) 162B, and a high-voltage load (an electric load) 163B to feed power to them. Two DC—DC converters 18B and 181B are connected with the combination battery 13B. A power generator or an alternator 17 containing a rectifier is connected with the combination battery 13B. The power generator 17 is driven by the engine. A controller 22B is connected with the DC—DC converters 18B and 181B.

The combination battery 13B includes a lower battery block 121B, an intermediate battery block 122B, and a higher battery block 123B connected in series. The lithium cells 111B and 112B compose the lower battery block 121B. The lithium cells 113B–114B compose the intermediate battery block 122B. The lithium cells 115B–119B and 1110B compose the higher battery block 123B. The combination battery 13B has a negative terminal 151B, a first positive terminal 152B, a second positive terminal 153B, and a third positive terminal 154B referred to as a lower side terminal, a first intermediate terminal, a second intermediate terminal, and a higher side terminal respectively. The lower side terminal 151B leads from the negative end of the series of the lithium cells 111B–119B and 1110B. The first intermediate terminal 152B leads from the junction 141B between the lower battery block 121B and the intermediate battery block 122B (that is, the junction between the lithium cells 112B and 113B). The second intermediate terminal 153B leads from the junction 142B between the intermediate battery block 122B and the higher battery block 123B (that is, the junction between the lithium cells 114B and 115B). The higher side terminal 154B leads from the positive end of the series of the lithium cells 111B–119B and 1110B. Each of the lithium cells 111B–119B and 1110B generates a voltage of about 3.6 V on average. Thus, the voltage between the first positive terminal 152B and the negative terminal 151B is equal to about 7.2 V. The low-voltage load 161B is connected between the first positive terminal 152B and the negative terminal 151B. The voltage between the second positive terminal 153B and the negative terminal 151B is equal to about 14.4 V. The intermediate-voltage load 162B is connected between the second positive terminal 153B and the negative terminal 151B. The voltage between the third positive terminal 154B and the negative terminal 151B is equal to about 36.0 V. The high-voltage load 163B is connected between the third positive terminal 154B and the negative terminal 151B. The power generator 17 is connected between the positive and negative ends of the series of the lithium cells 111B–119B and 1110B in the combination battery 13B. The power generator 17 acts to charge the combination battery 13B. In addition, the power generator 17B can feed power to the low-voltage load 161B, the intermediate-voltage load 162B, and the high-voltage load 163B.

A cell voltage (SOC) balancer circuit 231B is connected with the positive and negative terminals of the lithium cells 111B and 112B in the lower battery block 121B. The cell voltage (SOC) balancer circuit 231B functions to equalize the voltages across the lithium cells 111B and 112B. The cell voltage (SOC) balancer circuit 231B is powered by the lower battery block 121B. The cell voltage (SOC) balancer circuit 231B is located near the lower battery block 121B. The cell voltage (SOC) balancer circuit 231B has a structure similar to that shown in FIG. 3. A cell voltage (SOC) balancer circuit 232B is connected with the positive and negative terminals of the lithium cells 113B and 114B in the intermediate battery block 122B. The cell voltage (SOC) balancer circuit 232B functions to equalize the voltages across the lithium cells 113B and 114B. The cell voltage (SOC) balancer circuit 232B is powered by the intermediate battery block 122B. The cell voltage (SOC) balancer circuit 232B is located near the intermediate battery block 122B. The cell voltage (SOC) balancer circuit 232B has a structure similar to that shown in FIG. 3. A cell voltage (SOC) balancer circuit 233B is connected with the positive and negative terminals of the lithium cells 115B–119B and 1110B in the higher battery block 123B. The cell voltage (SOC) balancer circuit 233B functions to equalize the voltages across the lithium cells 115B–119B and 1110B. The cell voltage (SOC) balancer circuit 233B is powered by the higher battery block 123B. The cell voltage (SOC) balancer circuit 233B is located near the higher battery block 123B. The cell voltage (SOC) balancer circuit 233B has a structure similar to that shown in FIG. 3.

The DC—DC converter 18B is similar in structure to the DC—DC converter 18 in FIG. 2. A first input terminal of the DC—DC converter 18B is connected with the junction 142B between the intermediate battery block 122B and the higher battery block 123B (that is, the junction between the lithium cells 114B and 115B). A second input terminal of the DC—DC converter 18B is connected to the positive end of the series of the lithium cells 111B–119B and 1110B. A first output terminal of the DC—DC converter 18B is connected to the negative end of the series of the lithium cells 111B–119B and 1110B. A second output terminal of the DC—DC converter 18B is connected to the junction 142B between the intermediate battery block 122B and the higher battery block 123B (that is, the junction between the lithium cells 114B and 115B). When the DC—DC converter 18B is activated, power is transmitted from the higher battery block 123B to the lower battery block 121B and the intermediate battery block 122B. The DC—DC converter 18B has a control terminal leading to a switching element therein and being connected with the controller 22B. The DC—DC converter 18B is controlled by the controller 22B.

The DC—DC converter 181B is similar in structure to the DC—DC converter 18 in FIG. 2. A first input terminal of the DC—DC converter 181B is connected with the junction 141B between the lower battery block 121B and the intermediate battery block 122B (that is, the junction between the lithium cells 112B and 113B). A second input terminal of the DC—DC converter 181B is connected to the junction 142B between the intermediate battery block 122B and the higher battery block 123B (that is, the junction between the lithium cells 114B and 115B). A first output terminal of the DC—DC converter 181B is connected to the negative end of the series of the lithium cells 111B–119B and 1110B. A second output terminal of the DC—DC converter 181B is connected to the junction 141B between the lower battery block 121B and the intermediate battery block 122B (that is, the junction between the lithium cells 112B and 113B). When the DC—DC converter 181B is activated, power is transmitted from the intermediate battery block 122B to the lower battery block 121B. The DC—DC converter 181B has a control terminal leading to a switching element therein and being connected with the controller 22B. The DC—DC converter 181B is controlled by the controller 22B.

During operation of the power supply apparatus in FIG. 4, power feed to the high-voltage load 163B is implemented by the lower battery block 121B, the intermediate battery block 122B, the higher battery block 123B, and the power generator 17. Power feed to the intermediate-voltage load 162B is implemented by the lower battery block 121B and the intermediate battery block 122B. Also, power can be fed to the intermediate-voltage load 162B from the higher battery block 123B via the DC—DC converter 18B. Power feed to the low-voltage load 161B is implemented by the lower battery block 121B. Also, power can be fed to the low-voltage load 161B from the intermediate battery block 122B via the DC—DC converter 181B.

The controller 22B is connected with the negative and positive ends of the series of the lithium cells 111B–119B and 1110B, the junction 141B between the lower battery block 121B and the intermediate battery block 122B, and the junction 142B between the intermediate battery block 122B and the higher battery block 123B. Thus, the voltage across the lower battery block 121B, the voltage across the intermediate battery block 122B, and the voltage across the higher battery block 123B are applied to the controller 22B.

The controller 22B includes, for example, a microcomputer having a combination of an input/output circuit, a CPU, a ROM, and a RAM. The controller 22B operates in accordance with a program stored in the ROM. The program is designed to enable the controller 22B to implement operation steps mentioned hereafter. The controller 22B monitors the voltage across the lower battery block 121B, the voltage across the intermediate battery block 122B, the voltage across the higher battery block 123B, and the voltage across the set of the lower battery block 121B and the intermediate battery block 122B. The controller 22B calculates the ratio between (1) the monitored voltage across the set of the lower battery block 121B and the intermediate battery block 122B and (2) the monitored voltage across the higher battery block 123B. The controller 22B compares the calculated ratio with a reference ratio "4:6" or "2:3". The controller 22B controls the DC—DC converter 18B in response to the result of the comparison so that the ratio between (1) the voltage across the set of the lower battery block 121B and the intermediate battery block 122B and (2) the voltage across the higher battery block 123B will be equal to the reference ratio. In addition, the controller 22B calculates the ratio between the monitored voltage across the lower battery block 121B and the monitored voltage across the intermediate battery block 122B. The controller 22B compares the calculated ratio with a reference ratio "1:1". The controller 22B controls the DC—DC converter 1811B in response to the result of the comparison so that the ratio between the voltage across the lower battery block 121B and the voltage across the intermediate battery block 122B will be equal to the reference ratio.

It should be noted that the lithium cells 111B–119B and 1110B may be replaced by electric double layer capacitors.

Fourth Specific Embodiment

Figure 5:
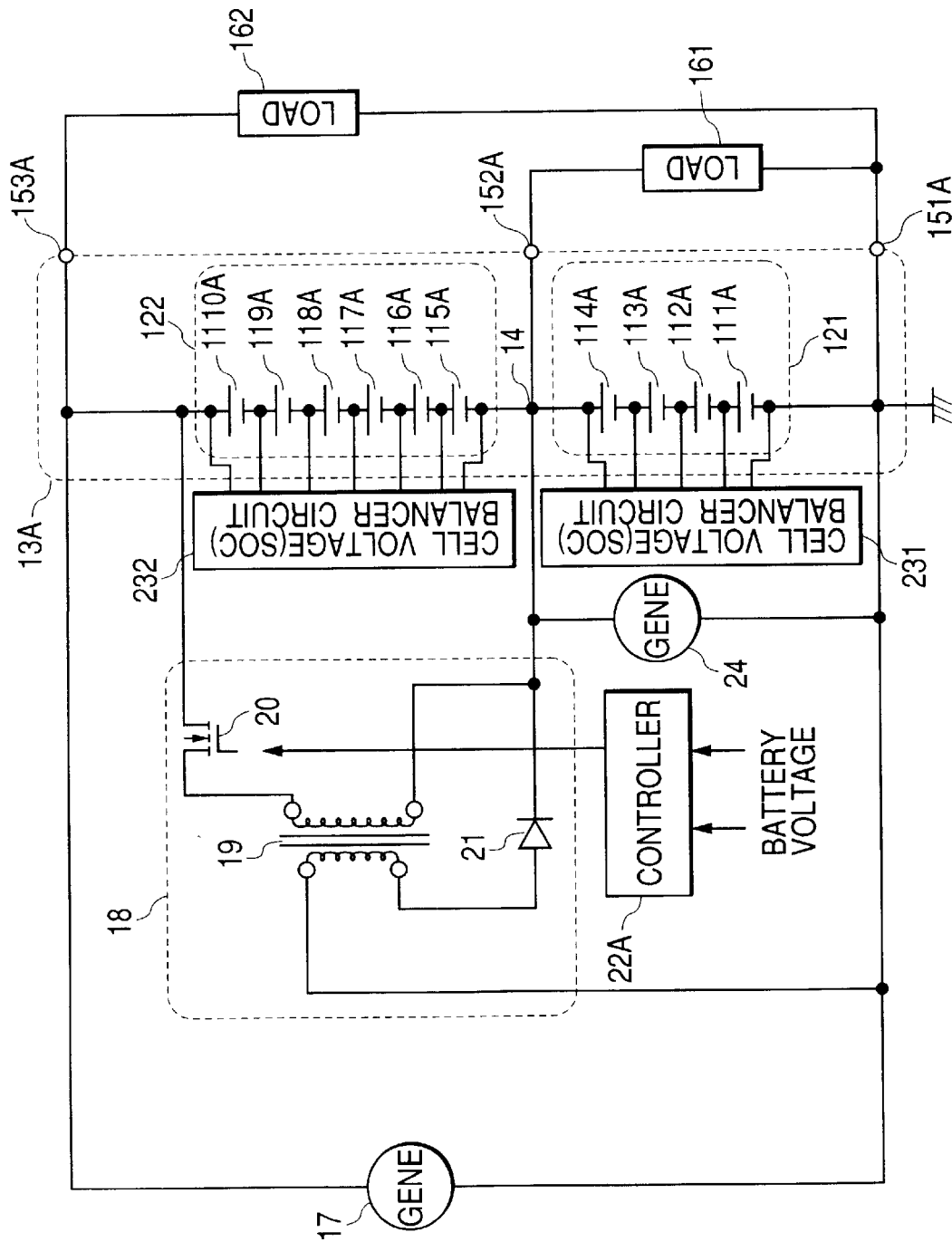
FIG. 5 is a diagram of a power supply apparatus of a multiple-voltage-output type according to a fourth specific embodiment of this invention.

FIG. 5 shows a power supply apparatus of a multiple-voltage-output type according to a fourth specific embodiment of this invention. The power supply apparatus in FIG. 5 is similar to that in FIG. 2 except for the following additional design.

The power supply apparatus in FIG. 5 includes a power generator 24 driven by, for example, the engine. The output side of the power generator 24 is connected across the lower battery block 1121. The power generator 24 can feed a portion of power required by the low-voltage load 161. The power generator 24 can assist the DC—DC converter 18.

Fifth Specific Embodiment

A fifth specific embodiment of this invention is similar to the second specific embodiment thereof except for points mentioned later.

Figure 6:
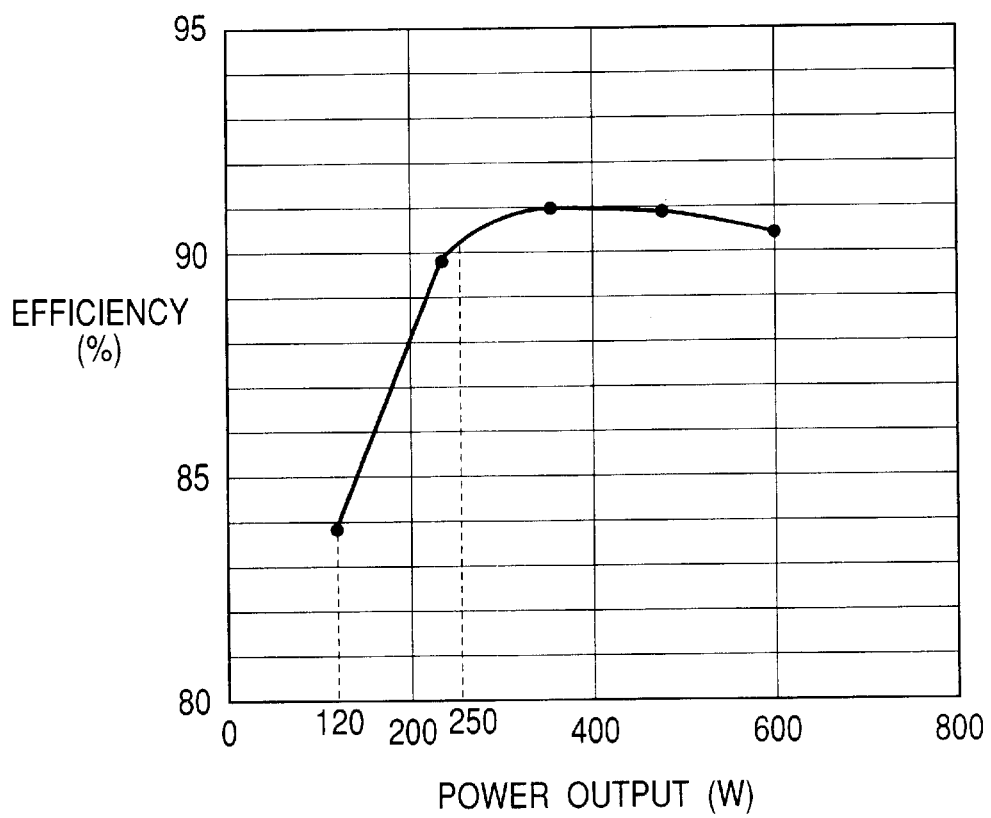
FIG. 6 is a diagram of the relation between the efficiency of a DC—DC converter 18 and the power outputted therefrom.

As shown in FIG. 6, the efficiency of the DC—DC converter 18 (see FIG. 2) depends on the power outputted therefrom. When the power output from the DC—DC converter 18 is in the range of 250 W to 600 W, the efficiency thereof is between 90% and 91%. As the power output decreases below 250 W, the efficiency considerably drops from a good range (90%–91%).

In the fifth specific embodiment of this invention, the activation or drive of the DC—DC converter 18 is changed between an intermittent mode and a continuous mode (a real-time mode). For example, the DC—DC converter 18 is intermittently activated when being required to output power less than 250 W. The intermittent activation of the DC—DC converter 18 enhances its effective efficiency.

Figure 7:
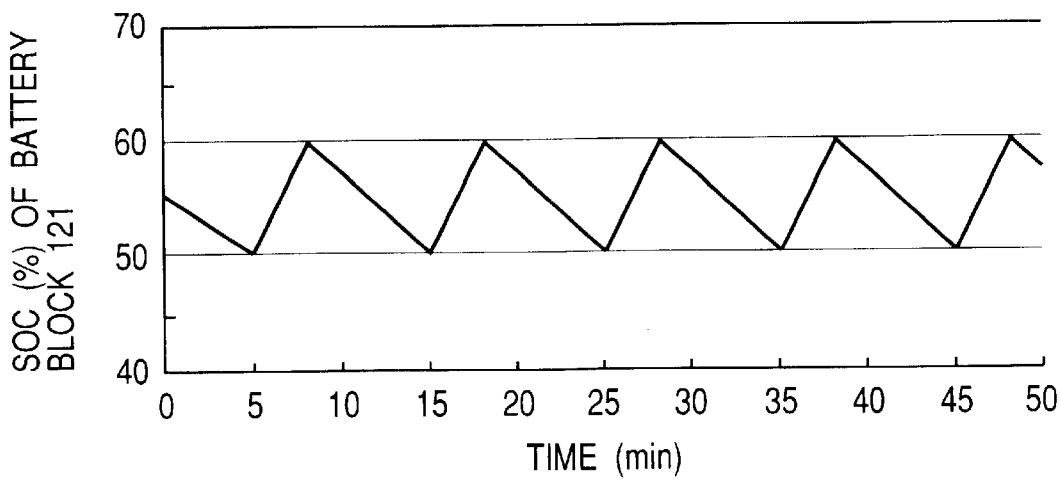
FIG. 7 is a time-domain diagram of the SOC of a lower battery block in a fifth specific embodiment of this invention.

The controller 22A (see FIG. 2) calculates the state of charge (SOC) of the lower battery block 121 in a known way. A SOC sensor may be provided to detect the SOC of the lower battery block 121. In this case, the controller 22A derives the SOC of the lower battery block 121 from the output signal of the SOC sensor. When the SOC of the lower battery block 121 drops to 50%, the controller 22A activates the DC—DC converter 18 at a power output of 400 W. For example, power of 200 W is fed to the low-voltage load 161 (see FIG. 2) while power of 200 W is stored in the lower battery block 121. As a result, the SOC of the lower battery block 121 rises. When the SOC of the lower battery block 121 rises to 60%, the controller 22A deactivates the DC—DC converter 18. In this case, power of 200 W is fed to the low-voltage load 161 only from the lower battery block 121, and hence the SOC of the lower battery block 121 drops. Accordingly, the SOC of the lower battery block 121 varies between 50% and 60% as shown in FIG. 7.

Figure 8:
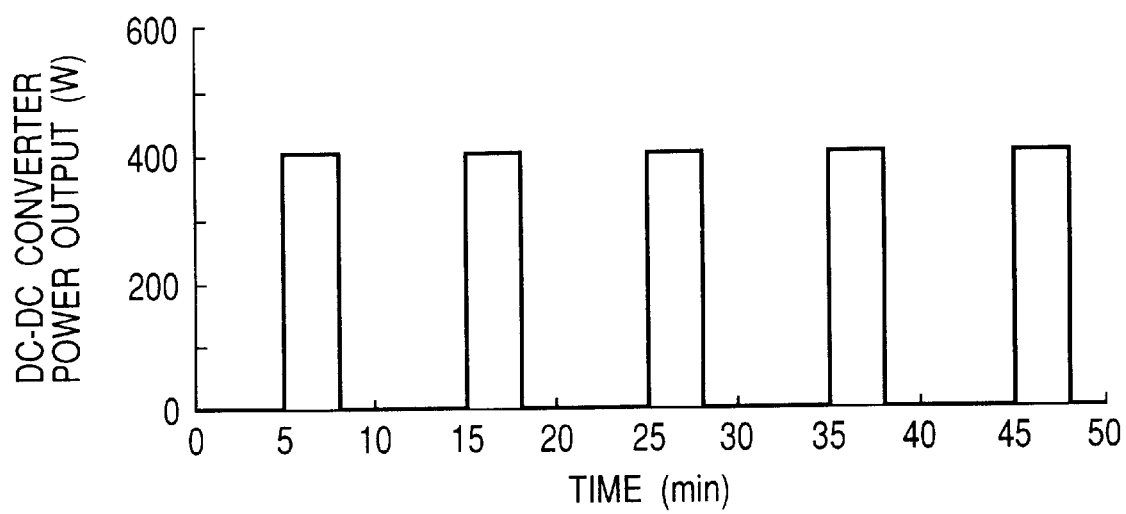
FIG. 8 is a time-domain diagram of the power output from a DC—DC converter.
Figure 9:
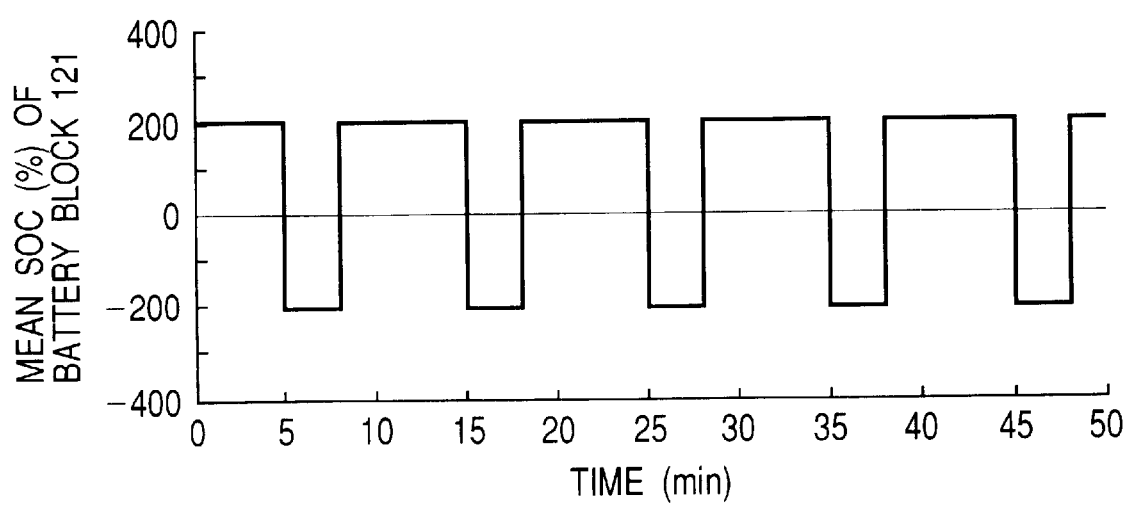
FIG. 9 is a time-domain diagram of the mean SOC of the lower battery block.

The DC—DC converter 18 is activated and deactivated so that the power output thereof varies as shown in FIG. 8. In this case, the mean SOC of the lower battery block 121 varies as shown in FIG. 9.

Preferably, the controller 22A calculates the power consumed by the low-voltage load 161 in a known way. A power sensor may be provided to detect the power consumed by the low-voltage load 161. In this case, the controller 22A derives the consumed power from the output signal of the power sensor. The controller 22A compares the consumed power with a prescribed value. When the consumed power is equal to or less than the prescribed value, the controller 22A sets the activation of the DC—DC converter 18 in the intermittent mode. When the consumed power is greater than the prescribed value, the controller 22A sets the activation of the DC—DC converter 18 in the continuous mode.

In the case where the DC—DC converter 18 is continuously activated at a power output equal to the power consumed by the low-voltage load 161, the total energy efficiency (the apparatus operation efficiency) E1 is expressed as follows.

$$E1=\{0.4+0.6\eta DC(0.6PL)/100\}\cdot 100[\%] \quad (1)$$

where PL denotes the power consumed by the low-voltage load 161, and $\eta DC(P)$ denotes the efficiency of the DC—DC converter 18 which is a function of the power output P thereof (see FIG. 6).

In the case where the DC—DC converter 18 is intermittently activated at a prescribed power output or a specified power output Pconst corresponding to a good efficiency, power is stored into and outputted from the lower battery block 121 so that losses occur due to the charging and discharging of the lower battery block 121. Thus, in this case, the total energy efficiency (the apparatus operation efficiency) E2 is expressed as follows.

$$E2=[0.4+\{0.6\eta DC(Pconst)/100\}\cdot\{\eta bat1(Pconst-PL)/100\}\cdot\{\eta bat2(PL)/100\}]\cdot 100[\%] \quad (2)$$

where $\eta bat1$ denotes the charging efficiency (%) of the lower battery block 121 which is a function of charging power, and $\eta bat2$ denotes the discharging efficiency (%) of the lower battery block 121 which is a function of discharging power.

Figure 10:
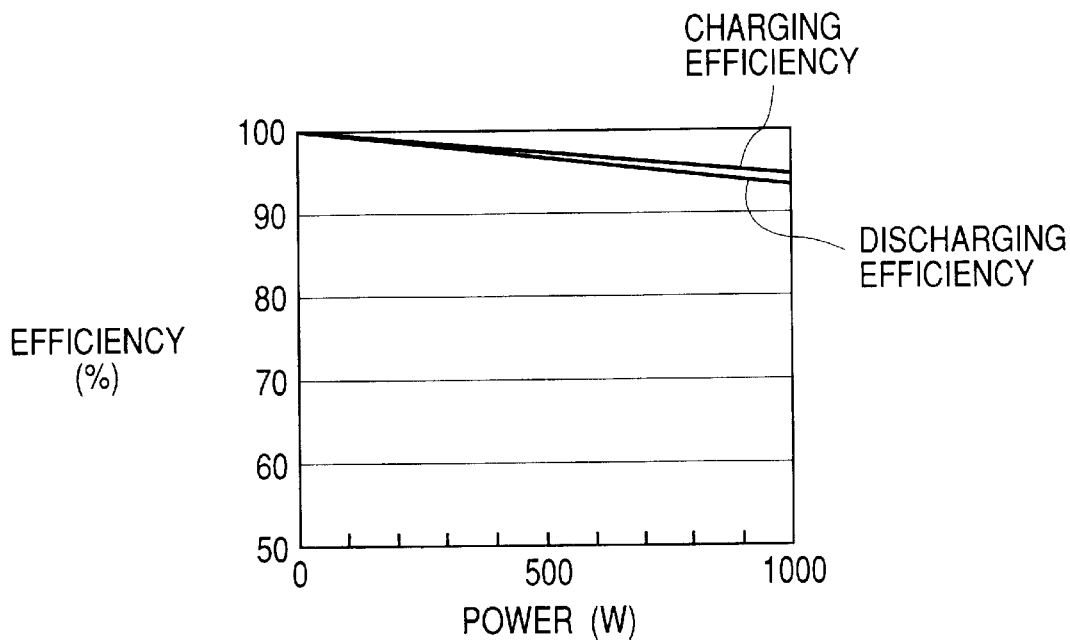
FIG. 10 is a diagram of the relation between the charging efficiency of the lower battery block and the charging power, and also the relation between the discharging efficiency of the lower battery block and the discharging power.

The charging efficiency $\eta bat1$ and the discharging efficiency $\eta bat2$ of the lower battery block 121 depend on the internal resistance thereof. The charging efficiency $\eta bat1$ of the lower battery block 121 varies as a function of charging power. The discharging efficiency $\eta bat2$ of the lower battery block 121 varies as a function of discharging power. In the case where the per-cell internal resistance of the lower battery block 121 is equal to 2 mΩ, the charging efficiency $\eta bat1$ of the lower battery block 121 drops in accordance with an increase in charging power as shown in FIG. 10. Similarly, the discharging efficiency $\eta bat2$ of the lower battery block 121 drops in accordance with an increase in discharging power as shown in FIG. 10.

Preferably, the controller 22A estimates or calculates the total energy efficiencies E1 and E2. The controller 22A compares the calculated total energy efficiencies E1 and E2. When the calculated total energy efficiency E1 is equal to or greater than the calculated total energy efficiency E2, the controller 22A sets the activation of the DC—DC converter 18 in the continuous mode (the real-time mode). In this case, the DC—DC converter 18 continuously operates at a power output equal to the power consumed by the low-voltage load 161. When the calculated total energy efficiency E1 is less than the calculated total energy efficiency E2, the controller 22A sets the activation of the DC—DC converter 18 in the intermittent mode. In this case, the DC—DC converter 18 intermittently operates at such a power output as to optimize the efficiency thereof.

Figure 11:
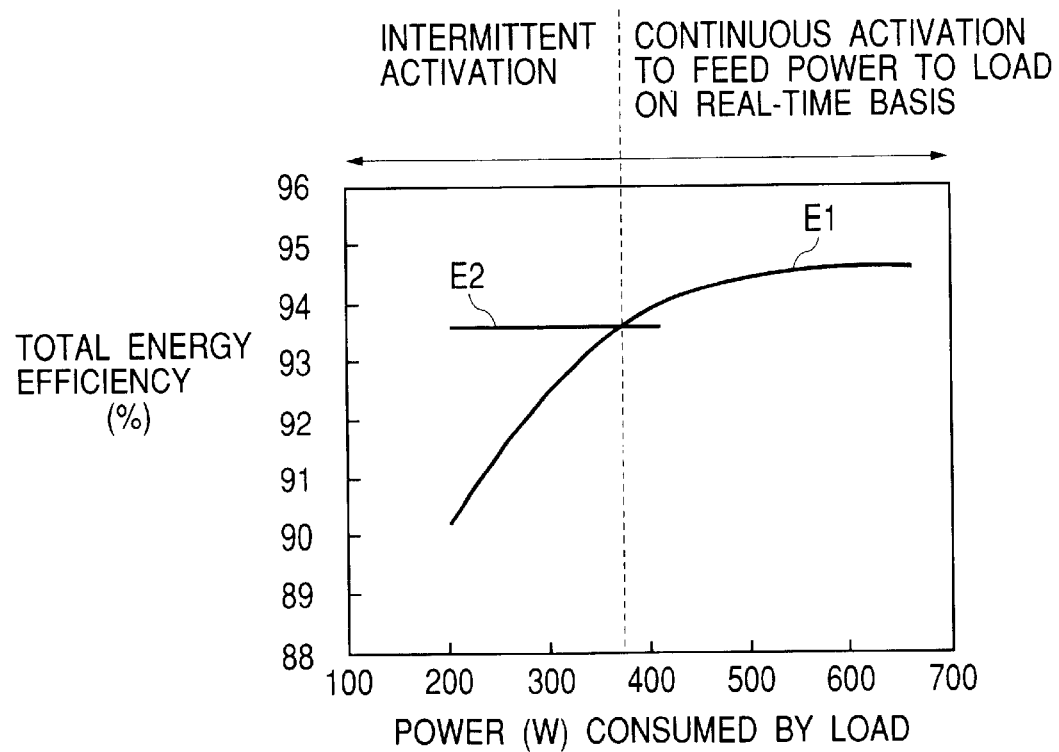
FIG. 11 is a diagram of the relation among total energy efficiencies and the power consumed by a load in the fifth specific embodiment of this invention.

Under the condition that the per-cell internal resistance of the lower battery block 121 is equal to 2 mΩ and the prescribed power output (the specified power output) Pconst is equal to 400 W, the total energy efficiencies E1 and E2 have relations with the power PL consumed by the low-voltage load 161 as shown in FIG. 11. When the consumed power PL is significantly greater than about 300 W, the total energy efficiency E1 is clearly greater than the total energy efficiency E2. Thus, in this case, the DC—DC converter 18 is continuously activated at a power output equal to the power consumed by the low-voltage load 161. When the consumed power PL is smaller than about 370 W, the total energy efficiency E1 is clearly lower than the total energy efficiency E2. Thus, in this case, the DC—DC converter 18 is intermittently activated.

It should be noted that the DC—DC converter 18 may be controlled in response to the voltage across the lower battery block 121 rather than the SOC thereof.

Sixth Specific Embodiment

A sixth specific embodiment of this invention is similar to the second specific embodiment thereof except for points mentioned later. In the sixth specific embodiment of this invention, the controller 22A (see FIG. 2) is provided with a timer, and is responsive to an ignition switch (a vehicle engine ignition switch). Operation of the controller 22A changes between an awake mode and a sleep mode in response to the position of the ignition switch and also the lapse of time which is measured by the timer. Specifically, operation of the controller 22A is in the awake mode when the ignition switch is in its ON position.

Figure 12:
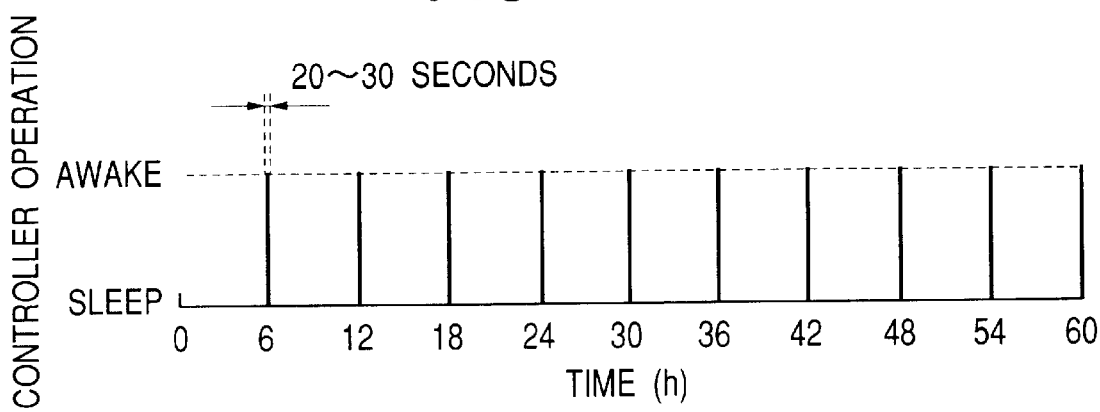
FIG. 12 is a time-domain diagram of the mode of operation of a controller in a sixth specific embodiment of this invention.

With reference to FIG. 12, in the case where the ignition switch remains in its OFF position, the timer enables the controller 22A (see FIG. 2) to change from the sleep mode of operation to the awake mode of operation and to operate in the awake mode for several tens of seconds (for example, 20 to 30 seconds) once per about 6 hours. During every operation in the awake mode, the controller 22A measures the voltage across the lower battery block 121 and compares the measured voltage with a prescribed level. Preferably, the prescribed level is equal to 14.4 V. When the measured voltage is equal to or lower than the prescribed level, the controller 22A activates the DC—DC converter 18 (see FIG. 2) to transmit about 400-W power from the higher battery block 122 (see FIG. 2) to the lower battery block 121 for about 15 seconds. On the other hand, when the measured voltage is higher than the prescribed level, the controller 22A holds the DC—DC converter 18 inactive.

Figure 13:
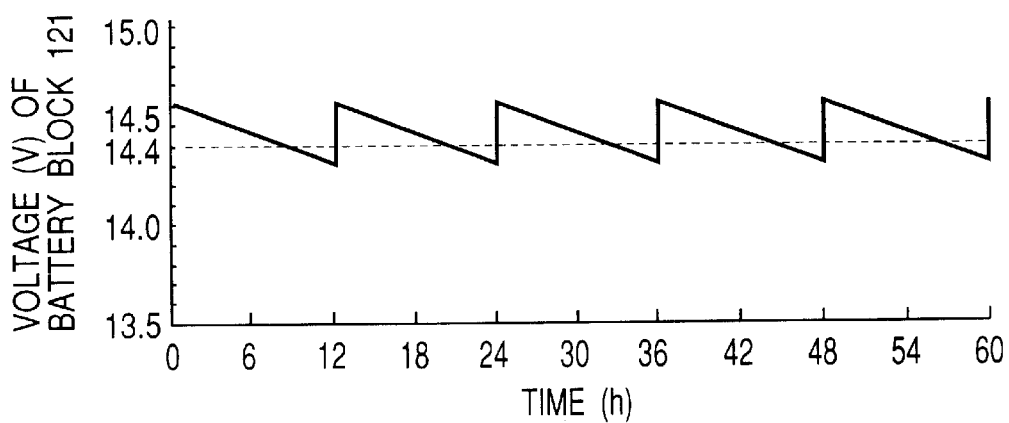
FIG. 13 is a time-domain diagram of the voltage across a lower battery block.
Figure 14:
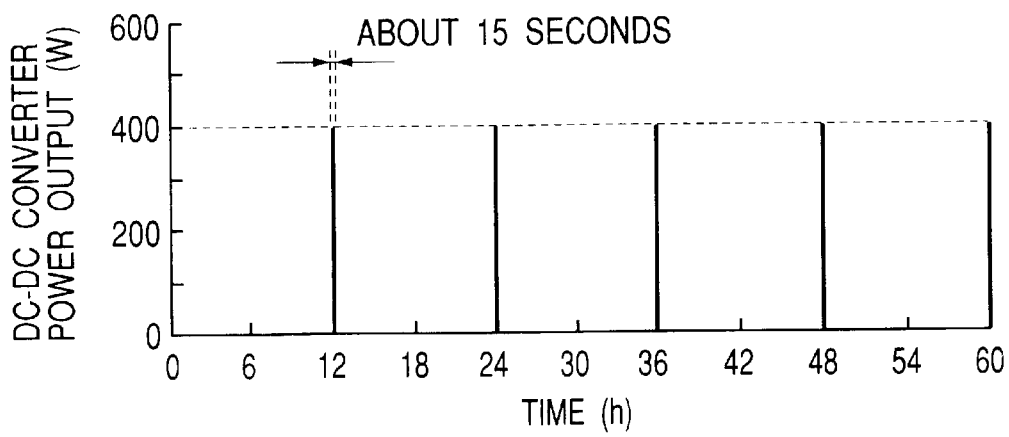
FIG. 14 is a time-domain diagram of the power output from a DC—DC converter.

With reference to FIG. 13, the voltage across the lower battery block 121 varies in accordance with the lapse of time. At time points of 6 hours, 18 hours, 30 hours, 42 hours, and 54 hours, the voltage across the lower battery block 121 is higher than the prescribed level (14.4 V) so that the DC—DC converter 18 is inactive. At each of time points of 12 hours, 24 hours, 36 hours, 48 hours, and 60 hours, the voltage across the lower battery block 121 is lower than the prescribed level (14.4 V) so that the DC—DC converter 18 is activated at a power output of 400 W to charge the lower battery block 121 for about 15 seconds as shown in FIG. 14. Therefore, at these time points, the voltage across the lower battery block 121 rises.

Seventh Specific Embodiment

A seventh specific embodiment of this invention is similar to the second specific embodiment thereof except for points mentioned later. The DC—DC converter 18 (see FIG. 2) generates heat when being activated. In the seventh specific embodiment of this invention, the DC—DC converter 18 is designed to be exposed to and cooled by a flow of air which is caused when the vehicle is traveling. On the other hand, when the vehicle is stationary, such a cooling air flow is absent.

In the seventh specific embodiment of this invention, the controller 22A (see FIG. 2) is connected with a vehicle speed sensor to get information about the speed of the vehicle. The controller 22A compares the vehicle speed with a prescribed value equal to, for example, 10 km/h. When the vehicle speed is equal to or lower than the prescribed value, the controller 22A holds the DC—DC converter 18 inactive to prevent the DC—DC converter 18 from generating heat. On the other hand, when the vehicle speed is higher than the prescribed value, the controller 22A permits the activation of the DC—DC converter 18.

In the case where the vehicle speed is equal to or lower than the prescribed value, the DC—DC converter 18 is held inactive and hence only power in the lower battery block (see FIG. 2) is consumed by the low-voltage load 161 (see FIG. 2). Preferably, in the case where the vehicle speed is higher than the prescribed value, the controller 22A controls the DC—DC converter 18 to keep the per-cell voltage of the lower battery block 121 greater by a given value than the per-cell voltage of the higher battery block 122 (see FIG. 2). This action prevents the lower battery block 121 from being over-discharged when the vehicle speed remains equal to or lower than the prescribed value for a long time.

Preferably, the controller 22A calculates the state of charge (SOC) of the lower battery block 121 in a known way. A SOC sensor may be provided to detect the SOC of the lower battery block 121. In this case, the controller 22A derives the SOC of the lower battery block 121 from the output signal of the SOC sensor. Also, the controller 22A calculates the state of charge (SOC) of the higher battery block 122 in a known way. A SOC sensor may be provided to detect the SOC of the higher battery block 122. In this case, the controller 22A derives the SOC of the higher battery block 122 from the output signal of the SOC sensor. Preferably, in the case where the vehicle speed is higher than the prescribed value, the controller 22A controls the DC—DC converter 18 to keep the SOC of the lower battery block 121 greater by a given value than the SOC of the higher battery block 122. This action prevents the lower battery block 121 from being over-discharged when the vehicle speed remains equal to or lower than the prescribed value for a long time.

Figure 15:
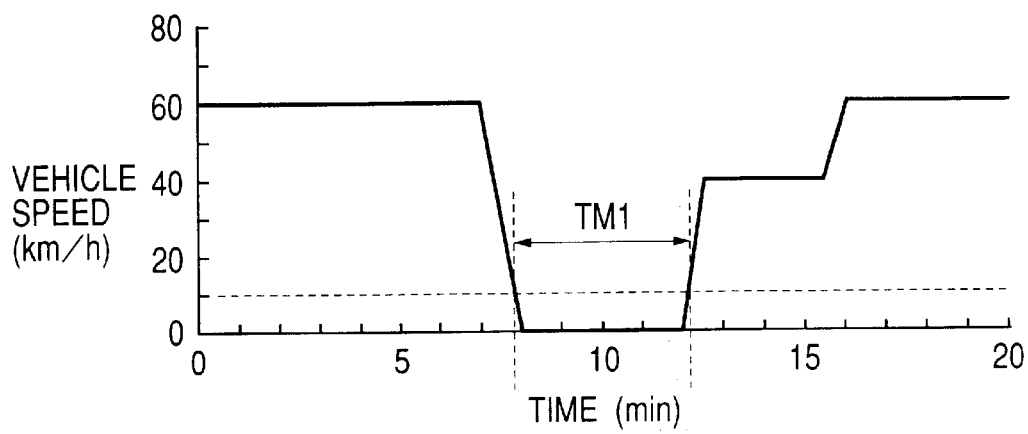
FIG. 15 is a time-domain diagram of the speed of a vehicle in a seventh specific embodiment of this invention.
Figure 16:
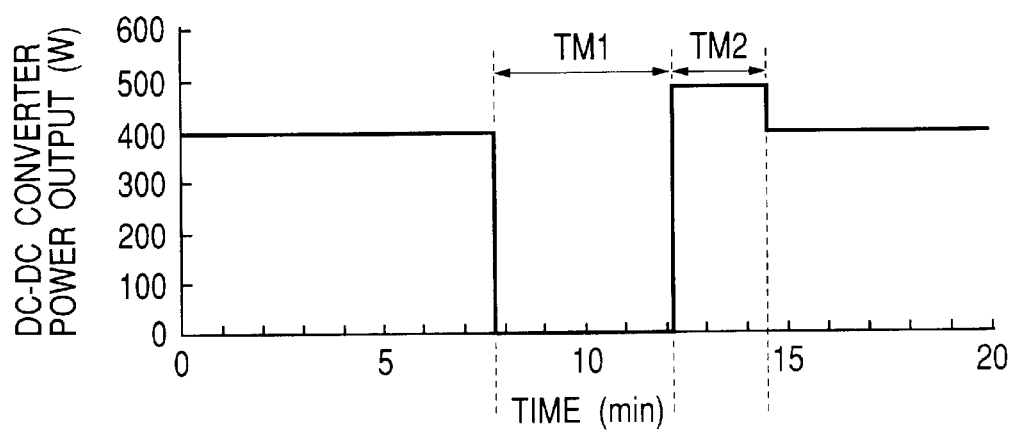
FIG. 16 is a time-domain diagram of the power output from a DC—DC converter.
Figure 17:
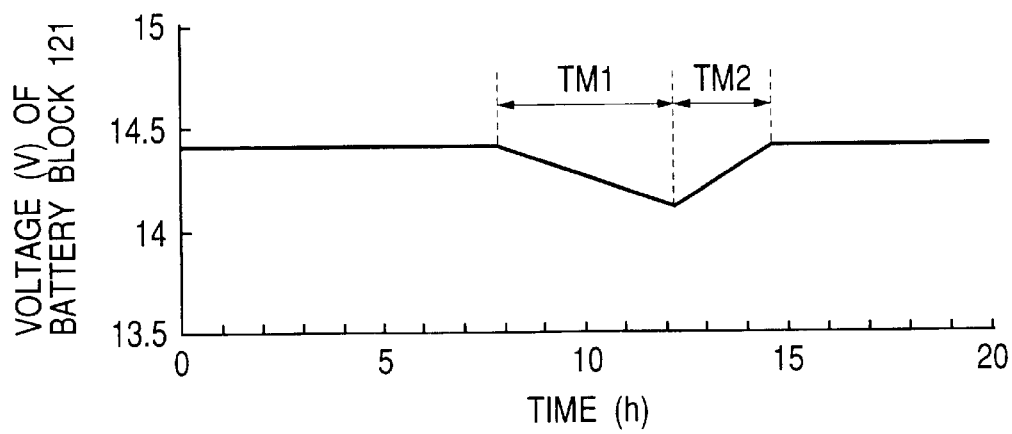
FIG. 17 is a time-domain diagram of the voltage across a lower battery block.

With reference to FIG. 15, the vehicle speed changes in accordance with the lapse of time. During the time interval TM1 between a time point of about 8 minutes and a time point of about 12 minutes, the vehicle speed continues to be equal to or lower than the prescribed value (10 km/h). Thus, during the time interval TM1, the DC—DC converter 18 remains inactive so that the power output thereof remains equal to 0 W as shown in FIG. 16. During a time interval TM2 immediately following the time interval TM1, the DC—DC converter 18 is activated at a power output of about 500 W greater than the normal level (400 W). During the time interval TM1, since the DC—DC converter 18 remains inactive, the voltage across the lower battery block 121 gradually drops as shown in FIG. 17. During the time interval TM2, since the DC—DC converter 18 is activated, the voltage across the lower battery block 121 rises.

Eighth Specific Embodiment

An eighth specific embodiment of this invention is similar to the fifth specific embodiment thereof except for points mentioned later. In the eighth specific embodiment of this invention, the controller 22A (see FIG. 2) is connected with a first sensor for detecting an electric parameter of the lower battery block 121 (see FIG. 2). The controller 22A derives the detected electric parameter from the output signal of the first sensor. The electric parameter of the lower battery block 121 is the voltage, the current, the ampere hour Ah, or the SOC thereof. Also, the controller 22A is connected with a second sensor for detecting an electric parameter of the higher battery block 122 (see FIG. 2). The controller 22A derives the detected electric parameter from the output signal of the second sensor. The electric parameter of the higher battery block 122 is the voltage, the current, the ampere hour Ah, or the SOC thereof.

Preferably, the controller 22A delays the start of activation of the DC—DC converter 18 (see FIG. 2) until the electric parameter of the lower battery block 121 becomes less than that of the higher battery block 122 by a given threshold value or more. Specifically, the controller 22A calculates the difference between the electric parameters of the lower battery block 121 and the higher battery block 122. The controller 22A compares the calculated difference with the threshold value. When the calculated difference exceeds the threshold value, the controller 22A permits the start of activation of the DC—DC converter 18.

Preferably, after the difference between the electric parameters of the lower battery block 121 and the higher battery block 122 is removed, the controller 22A keeps the activation of the DC—DC converter 18 for a limited time interval (a given time interval). In this case, the duration time of every activation of the DC—DC converter 18 is longer, and the integral of the current output from the DC—DC converter 18 is greater. Specifically, the controller 22A provides a hysteresis to operation of the DC—DC converter 18. In more detail, the controller 22A maintains the activation of the DC—DC converter 18 until the electric parameter of the lower battery block 121 becomes greater than that of the higher battery block 122 by a given threshold value or more. The threshold value for the end of activation of the DC—DC converter 18 is higher than the threshold value for the start of activation thereof.

Preferably, in the case where the difference between the electric parameters of the lower battery block 121 and the higher battery block 122 is less than a given small reference value, the controller 22A implements the intermittent activation of the DC—DC converter 18 for a preset time interval.

Ninth Specific Embodiment

A ninth specific embodiment of this invention is similar to a combination of the fifth, sixth, and seventh specific embodiments thereof except for points mentioned later.

Figure 18:
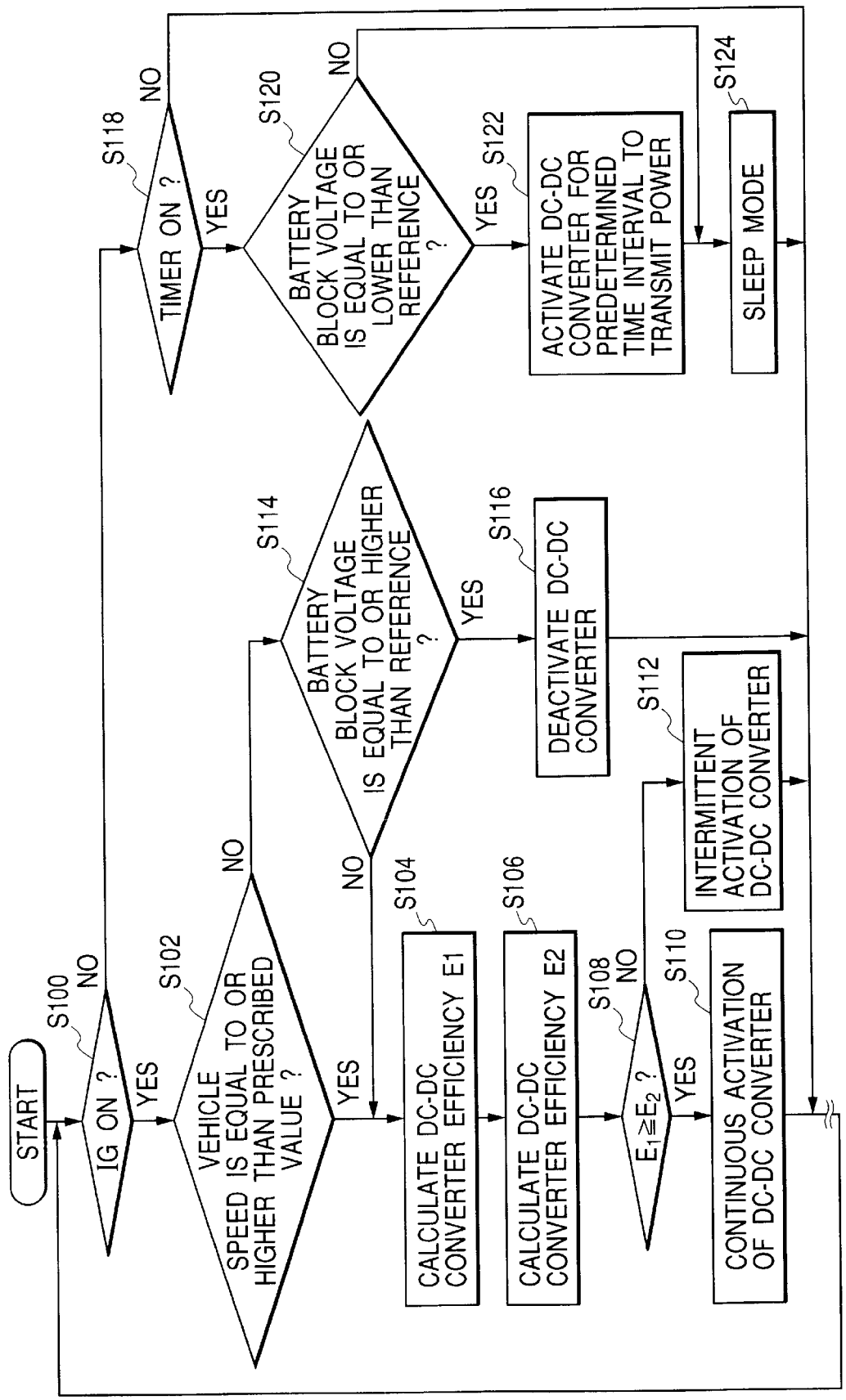
FIG. 18 is a flowchart of a segment of a program for a controller in a ninth specific embodiment of this invention.

FIG. 18 is a flowchart of a segment of a program for the controller 22A (see FIG. 2) in the ninth specific embodiment of this invention. As shown in FIG. 18, a first step S100 of the program segment determines whether or not the ignition switch is in its ON position by referring to the output signal therefrom. When the ignition switch is in its ON position, the program advances from the step S100 to a step S102. Otherwise, the program advances from the step S100 to a step S118.

The step S102 derives the current vehicle speed from the output signal of the vehicle speed sensor. The step S102 compares the current vehicle speed with the prescribed value (for example, 10 km/h). When the current vehicle speed is equal to or higher than the prescribed value, the program advances from the step S102 to a step S104. Otherwise, the program advances from the step S102 to a step S114.

The step S104 calculates the total energy efficiency E1 according to, for example, the previously-indicated equation (1). A step S106 following the step S104 calculates the total energy efficiency E2 according to, for example, the previously-indicated equation (2).

A step S108 subsequent to the step S106 compares the calculated total energy efficiencies E1 and E2. When the calculated total energy efficiency E1 is equal to or greater than the calculated total energy efficiency E2, the program advances from the step 108 to a step S110. Otherwise, the program advances from the step S108 to a step S112.

The step S110 sets the activation of the DC—DC converter 18 (see FIG. 2) in the continuous mode. In this case, the DC—DC converter 18 continuously operates at a power output equal to the power consumed by the low-voltage load 161 (see FIG. 2). After the step S110, the program returns to the step S100 via steps (not shown).

The step S112 sets the activation of the DC—DC converter 18 in the intermittent mode. In this case, the DC—DC converter 18 intermittently operates at such a power output as to optimize the efficiency thereof. After the step S112, the program returns to the step S100 via steps (not shown).

The step S114 compares the voltage across the lower battery block 121 (see FIG. 2) with a predetermined reference level. When the voltage across the lower battery block 121 is equal to or higher than the predetermined reference level, the program advances from the step S114 to a step S116. Otherwise, the program advances from the step S114 to the step S104.

The step S116 deactivates the DC—DC converter 18. After the step S116, the program returns to the step S100 via steps (not shown).

The step S118 determines whether or not the lapse of time which is indicated by the timer reaches a preset time equal to, for example, about 6 hours. When the lapse of time which is indicated by the timer reaches the preset time, the step S118 resets the timer and implements a procedure of changing the controller 22A to the awake mode of operation. Then, the program advances from the step S118 to a step S120. On the other hand, when the lapse of time which is indicated by the timer does not reach the preset time, the program returns from the step S118 to the step S100 via steps (not shown).

The step S120 compares the voltage across the lower battery block 121 with a predetermined reference level (for example, 14.4 V). When the voltage across the lower battery block 121 is equal to or lower than the predetermined reference level, the program advances from the step S120 to a step S122. Otherwise, the program jumps from the step S120 to a step S124. Generally, the predetermined reference level used by the step S120 differs from that used by the step S114. The predetermined reference level used by the step S120 may be the same as that used by the step S114.

The step S122 activates the DC—DC converter 18 to transmit power from the higher battery block 122 (see FIG. 2) to the lower battery block 121 for a predetermined time interval (for example, about 15 seconds). After the step S122, the program advances to the step S124.

The step S124 implements a procedure of changing the controller 22A to the sleep mode of operation. After the step S124, the program returns to the step S100 via steps (not shown).

Tenth Specific Embodiment

Figure 19:
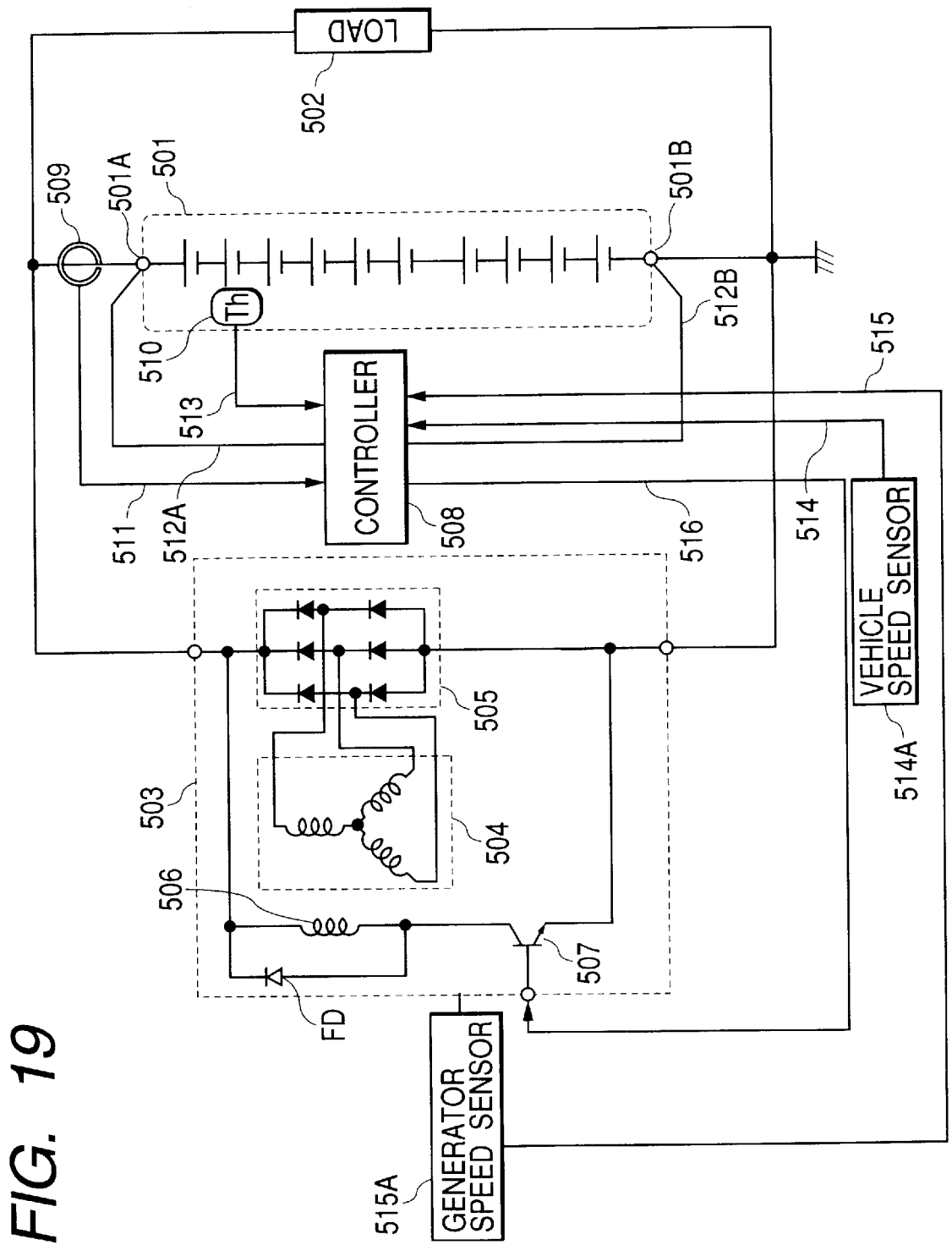
FIG. 19 is a diagram of an apparatus for controlling a vehicular power generator according to a tenth specific embodiment of this invention.

FIG. 19 shows an apparatus for controlling a vehicular power generator according to a tenth specific embodiment of this invention. The apparatus in FIG. 19 includes a combination battery 501 composed of lithium batteries (lithium cells or lithium ion cells) coupled together in series. The lithium batteries may be replaced by electric double layer capacitors. The combination battery 501 is connected with a load (an electric load) 502. The combination battery 501 feeds power to the load 502. A power generator (an alternator) 503 is connected with the combination battery 501 and the load 502. The power generator 503 feeds power to the load 502, and charges the combination battery 501.

The power generator 503 includes a drive shaft coupled with the output shaft of an engine (not shown) powering a vehicle. The drive shaft of the power generator 503 rotates as the output shaft of the engine rotates. Accordingly, the power generator 503 is driven by the engine.

The power generator 503 includes a 3-phase armature winding 504, a 3-phase full-wave rectifier 505, a field winding 506, a switch 507, and a flywheel diode FD. The 3-phase armature winding 504 is connected with the 3-phase full-wave rectifier 505. The 3-phase full-wave rectifier 505 is connected with the positive terminal 501A of the combination battery 501 and the negative terminal 501B thereof. One end of the field winding 506 is connected with one end of the 3-phase full-wave rectifier 505. The other end of the field winding 506 is connected via the switch 507 to the other end of the 3-phase full-wave rectifier 505. The flywheel diode FD is connected in parallel with the field winding 506. The switch 507 serves to control the field current (the current flowing through the field winding 506).

A controller 508 is connected with a control terminal of the switch 507 in the power generator 503 via a signal line 516. The controller 508 changes the switch 507 between its ON state and its OFF state, and thereby controls the power generator 503. As will be made clear later, the controller 508 can change activation or drive of the power generator 503 between a continuous mode (a real-time mode) and an intermittent mode.

A current sensor 509 is associated with a power feed line leading to the positive terminal 501A of the combination battery 501 from the power generator 503 and the load 502. The current sensor 509 detects the current flowing through the combination battery 501. The current sensor 509 is connected via a signal line 511 to the controller 508. The output signal of the current sensor 509 which represents the detected current flowing through the combination battery 501 is transmitted to the controller 508 via the signal line 511.

A signal line 512A connects the positive terminal 501A of the combination battery 501 with the controller 508. Another signal line 512B connects the negative terminal 501B of the combination battery 501 with the controller 508. The voltage across the combination battery 501 is applied to the controller 508 via the signal lines 512A and 512B.

A temperature sensor 510 is provided in the combination battery 501. The temperature sensor 510 detects the temperature of the combination battery 501. The temperature sensor 510 is connected via a signal line 513 to the controller 508. The output signal of the temperature sensor 510 which represents the detected temperature of the combination battery 501 is transmitted to the controller 508 via the signal line 513.

A vehicle speed sensor 514A detects the speed of the vehicle. The vehicle speed sensor 514A is connected via a signal line 514 to the controller 508. The output signal of the vehicle speed sensor 514A which represents the detected vehicle speed is transmitted to the controller 508 via the signal line 514.

An power-generator speed sensor 515A detects the rotational speed of the drive shaft of the power generator 503 which is referred to as the power-generator speed. The power-generator speed sensor 515A is connected via a signal line 515 to the controller 508. The output signal of the power-generator speed sensor 515A which represents the detected power-generator speed is transmitted to the controller 508 via the signal line 515.

The controller 508 includes, for example, a microcomputer having a combination of an input/output circuit, a CPU, a ROM, and a RAM. The controller 508 operates in accordance with a program stored in the ROM. The program is designed to enable the controller 508 to implement operation steps mentioned hereafter.

The controller 508 enables the power generator 503 to be selectively activated and deactivated. In other words, the controller 508 changes the power generator 503 between an ON state and an OFF state. The power generator 503 converts kinetic energy of the body of the vehicle into electric energy when being activated. In this case, the power generator 503 charges the combination battery 501 with the electric energy while the vehicle is decelerated or braked. Thus, energy recovery is implemented provided that the power generator 503 is activated when the vehicle is required to be decelerated or braked. The controller 508 determines whether or not the vehicle is decelerating on the basis of the output signal from the vehicle speed sensor 514A. The controller 508 may be connected with a sensor for detecting the position (or the stroke) of a vehicle brake pedal. In this case, the controller 508 determines whether or not the vehicle is required to be decelerated (braked) on the basis of the output signal from the brake-pedal position sensor (or the brake-pedal stroke sensor). When the vehicle is decelerating or when the vehicle is required to be decelerated, the controller 508 serves to activate the power generator 503 to implement energy recovery. In this case, the power generator 503 is operated at a power output approximately equal to the maximum power output which depends on the power-generator speed. In other operating conditions of the vehicle, the required power output from the power generator 503 is considerably smaller than that during deceleration of the vehicle.

Figure 20:
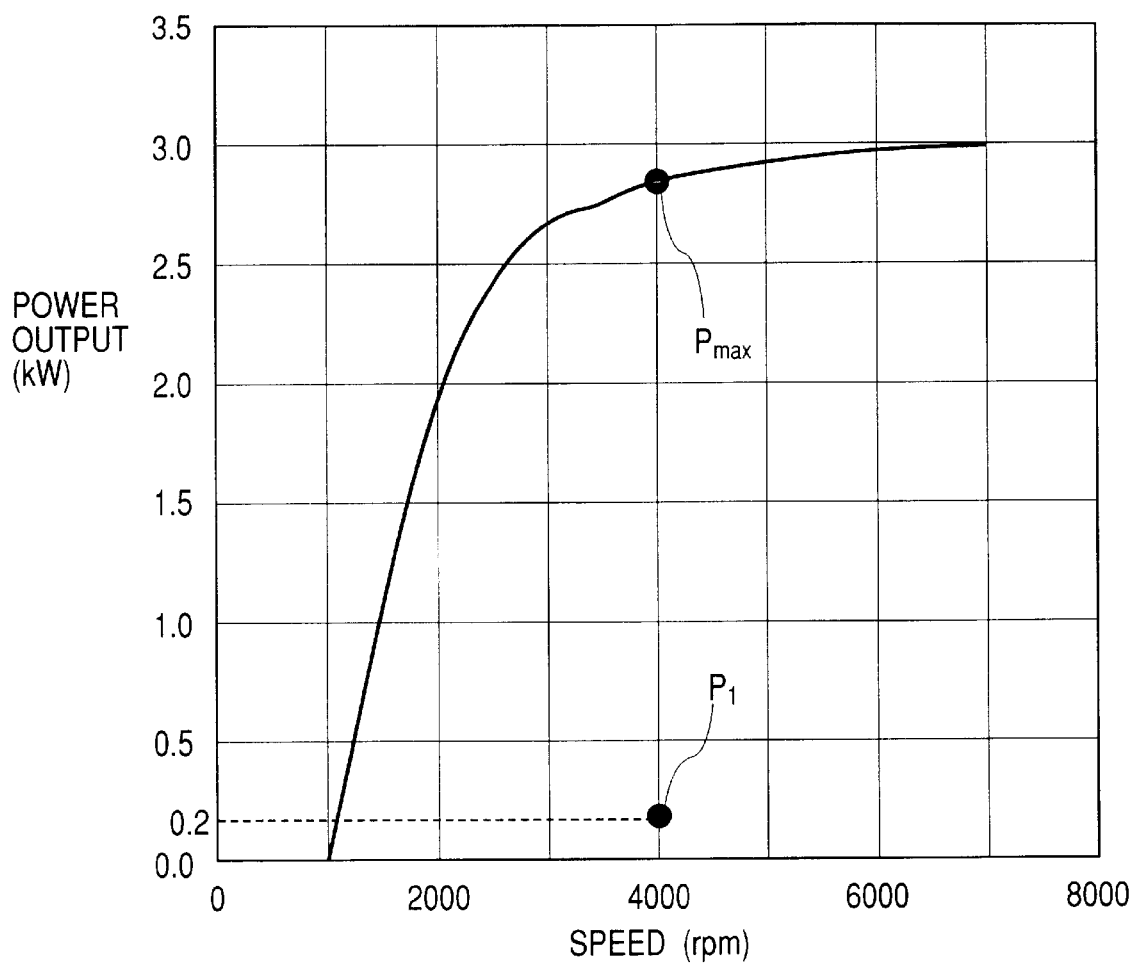
FIG. 20 is a diagram of the relation between the maximum power output of a power generator in FIG. 19 and the rotational speed thereof.

With reference to FIG. 20, the maximum power output Pmax of the power generator 503 increases as the power-generator speed (rpm) rises. In FIG. 20, the reference character P1 denotes the point of operation of the power generator 503 which occurs in an assumed case where the power-generator speed is equal to about 4,000 rpm and the power generator 503 is activated to produce power (for example, 0.2 kW) consumed by the load 502 on a real-time basis. The power output at the operation point P1 is considerably smaller than the maximum power output Pmax. For example, the power output at the operation point P1 is equal to about 7% of the maximum power output Pmax.

Figure 21:
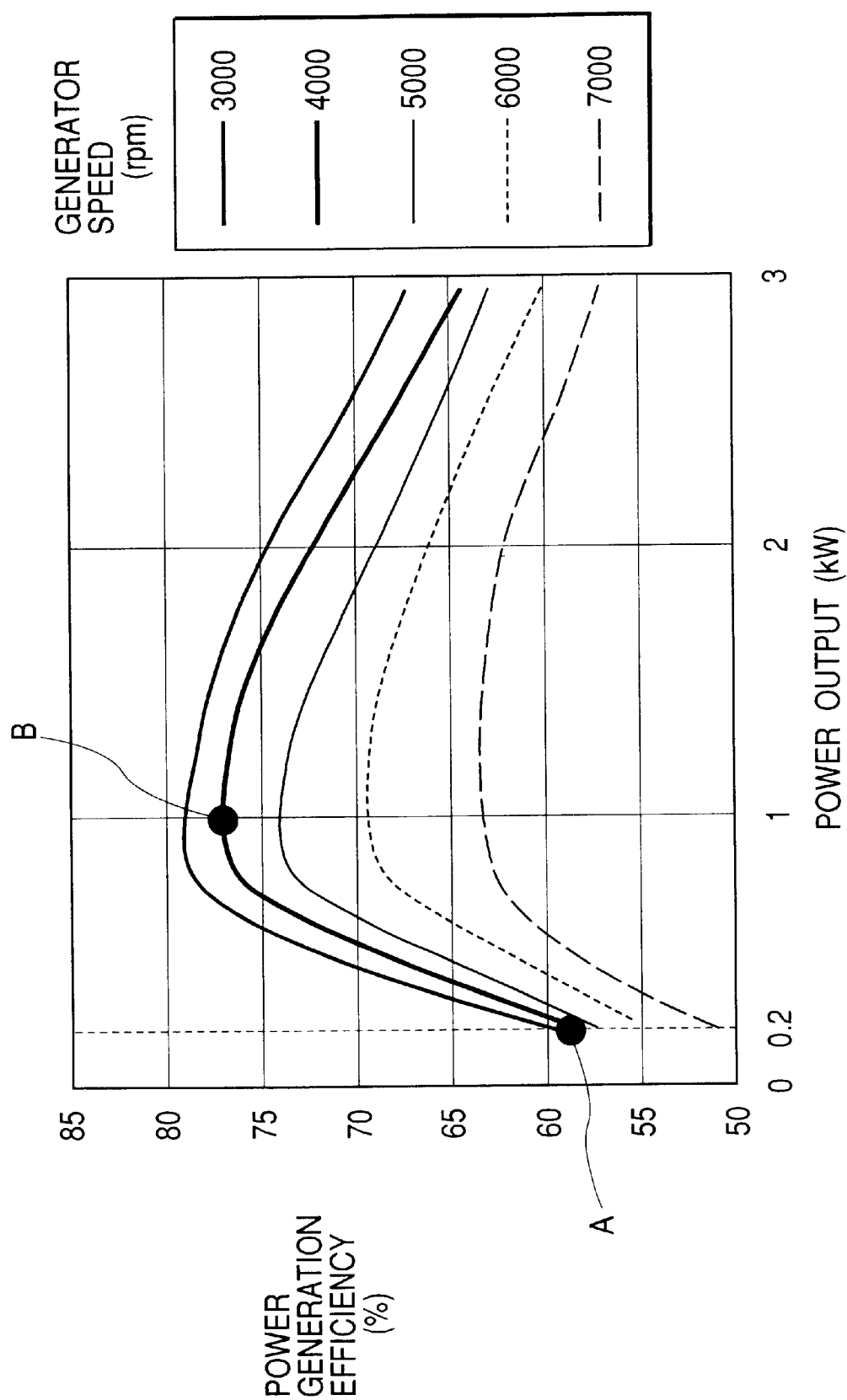
FIG. 21 is a diagram of the relation among the power generation efficiency of the power generator in FIG. 19, the power output thereof, and the rotational speed thereof.

As shown in FIG. 21, the power generation efficiency of the power generator 503 depends on both the power output thereof and the speed thereof. At an arbitrary power-generator speed, the power output of the power generator 503 which corresponds to the maximum power generation efficiency thereof can be uniquely decided. Specifically, in the case where the power-generator speed is fixed to 4,000 rpm, the power generation efficiency of the power generator 503 peaks when the power output therefrom is equal to about 1.0 kW. In FIG. 21, the point "A" denotes the power generation efficiency which occurs when the power output from the power generator 503 is equal to 0.2 kW and the speed thereof is equal to 4,000 rpm. On the other hand, the point "B" denotes the power generation efficiency which occurs when the power output from the power generator 503 is equal to 1.0 kW and the speed thereof is equal to 4,000 rpm. The power generation efficiency at the point "A" is lower than that at the point "B" by about 20%.

Figure 22:
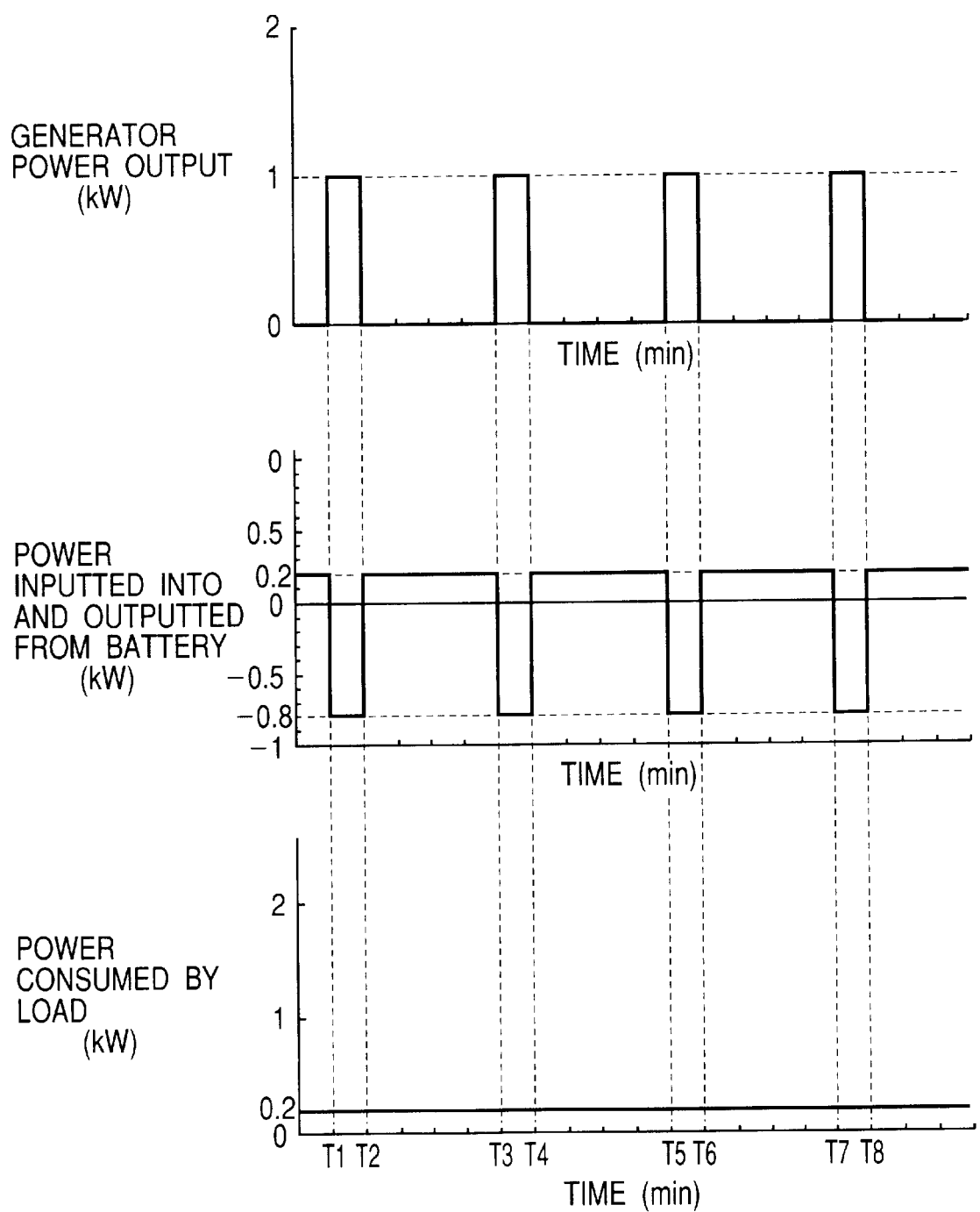
FIG. 22 is a time-domain diagram of the power output of the power generator in FIG. 19, the power inputted into and outputted from a combination battery in FIG. 19, and the power consumed by a load in FIG. 19.

In order to raise an effective power generation efficiency, the controller 508 intermittently activates the power generator 503 at the point "B" so that the mean power output (the average power output) of the power generator 503 will be equal to the power consumed by the load 502. During the intermittent activation of the power generator 503, the power output from the power generator 503 and the power inputted into and outputted from the combination battery 501 vary while the power consumed by the load 502 remains constant as shown in FIG. 22. Specifically, for the time interval between time points T1 and T2, the power generator 503 is activated at a power output of 1.0 kW. In this case, 0.2 kW is fed to the load 502 while 0.8 kW is used to charge the combination battery 501. During the time interval between the time point T2 and a next time point T3, the power generator 503 remains deactivated and the combination battery 501 feeds 0.2 kW to the load 502. Thereafter, similar operation steps are iterated. The duty cycle "(T2−T1)/(T3−T1)", that is, the ratio of the time interval "T2−T1" to the time interval "T3−T1", is equal to ⅕. Accordingly, the mean power output (the average power output) of the power generator 503 is equal to the power consumed by the load 502. Preferably, the power output of the power generator 503 is varied gradually to prevent a vehicle driver from feeling uncomfortable.

Power produced by the power generator 503 can be directly fed to the load 503. Also, power produced by the power generator 503 can be stored into the combination battery 501 before being fed from the combination battery 501 to the load 502. The charging and discharging of the combination battery 501 cause losses. Due to such losses, there occurs a difference in total energy efficiency between continuous activation of the power generator 503 and intermittent activation thereof. Specifically, in the case where the power consumed by the load 502 is equal to or less than a prescribed value, the total energy efficiency provided by the intermittent activation of the power generator 503 is higher than that provided by the continuous activation thereof. On the other hand, in the case where the power consumed by the load 502 is greater than the prescribed value, the total energy efficiency provided by the continuous activation of the power generator 503 is higher than that provided by the intermittent activation thereof.

In the case where the power generator 503 is continuously activated at a power output equal to the power consumed by the load 502, losses caused by the charging and discharging of the combination battery 501 are absent and hence the total energy efficiency TE1 is expressed as follows.

$$TE1 = \eta G(PL, N)[\%] \quad (3)$$

where PL denotes the power (W) consumed by the load 502, and ηG(P, N) denotes the power generation efficiency of the power generator 503 which is a function of the power output "p" thereof and the speed N thereof (see FIG. 21).

In the case where the power generator 503 is intermittently activated at a prescribed power output or a specified power output Pconst corresponding to a good efficiency, power is stored into and outputted from the combination battery 501 so that losses occur due to the charging and discharging of the combination battery 501. Thus, in this case, the total energy efficiency TE2 is expressed as follows.

$$TE2 = (PL/Pconst) \cdot \eta G(Pconst, N) + \quad (4)$$
$$(Pconst - PL)/Pconst \cdot \{\eta G(Pconst, N)/100\} \cdot$$
$$\{\eta bat1 (Pconst - PL)/100\} \cdot \{\eta bat2 (PL)/100\} \cdot 100 [\%]$$

where ηbat1 denotes the charging efficiency (%) of the combination battery 501 which is a function of charging power, and ηbat2 denotes the discharging efficiency (%) of the combination battery 501 which is a function of discharging power.

Figure 23:
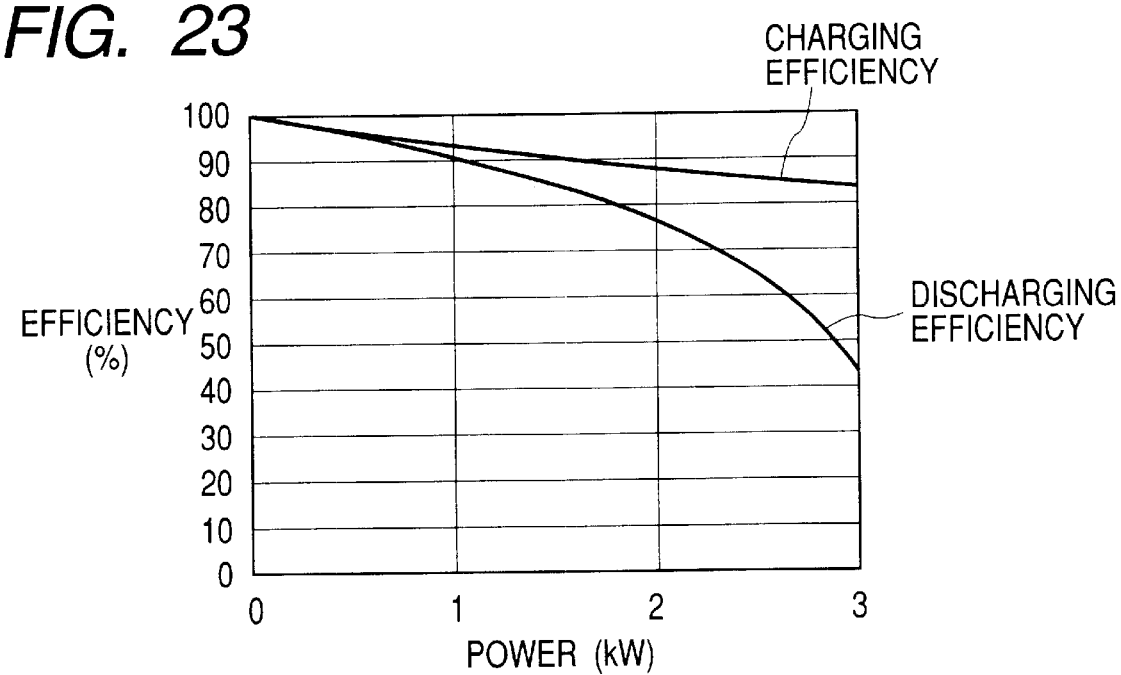
FIG. 23 is a diagram of the relation between the charging efficiency of the combination battery in FIG. 19 and the charging power, and also the relation between the discharging efficiency of the combination battery in FIG. 19 and the discharging power.

The charging efficiency ηbat1 and the discharging efficiency ηbat2 of the combination battery 501 depend on the internal resistance thereof. The charging efficiency ηbat1 of the combination battery 501 varies as a function of charging power. The discharging efficiency ηbat2 of the combination battery 501 varies as a function of discharging power. In the case where the internal resistance of the combination battery 501 is equal to 100 mΩ, the charging efficiency ηbat1 of the combination battery 501 drops in accordance with an increase in charging power as shown in FIG. 23. Similarly, the discharging efficiency ηbat2 of the combination battery 501 drops in accordance with an increase in discharging power as shown in FIG. 23.

Preferably, the controller 508 estimates or calculates the total energy efficiencies TE1 and TE2. The controller 508 compares the calculated total energy efficiencies TE1 and TE2. When the calculated total energy efficiency TE1 is equal to or greater than the calculated total energy efficiency TE2, the controller 508 sets the activation of the power generator 503 in the continuous mode (the real-time mode). In this case, the power generator 503 continuously operates at a power output equal to the power consumed by the load 502. When the calculated total energy efficiency TE1 is less than the calculated total energy efficiency TE2, the controller 508 sets the activation of the power generator 503 in the intermittent mode. In this case, the power generator 503 intermittently operates at such a power output as to optimize the efficiency thereof.

Figure 24:
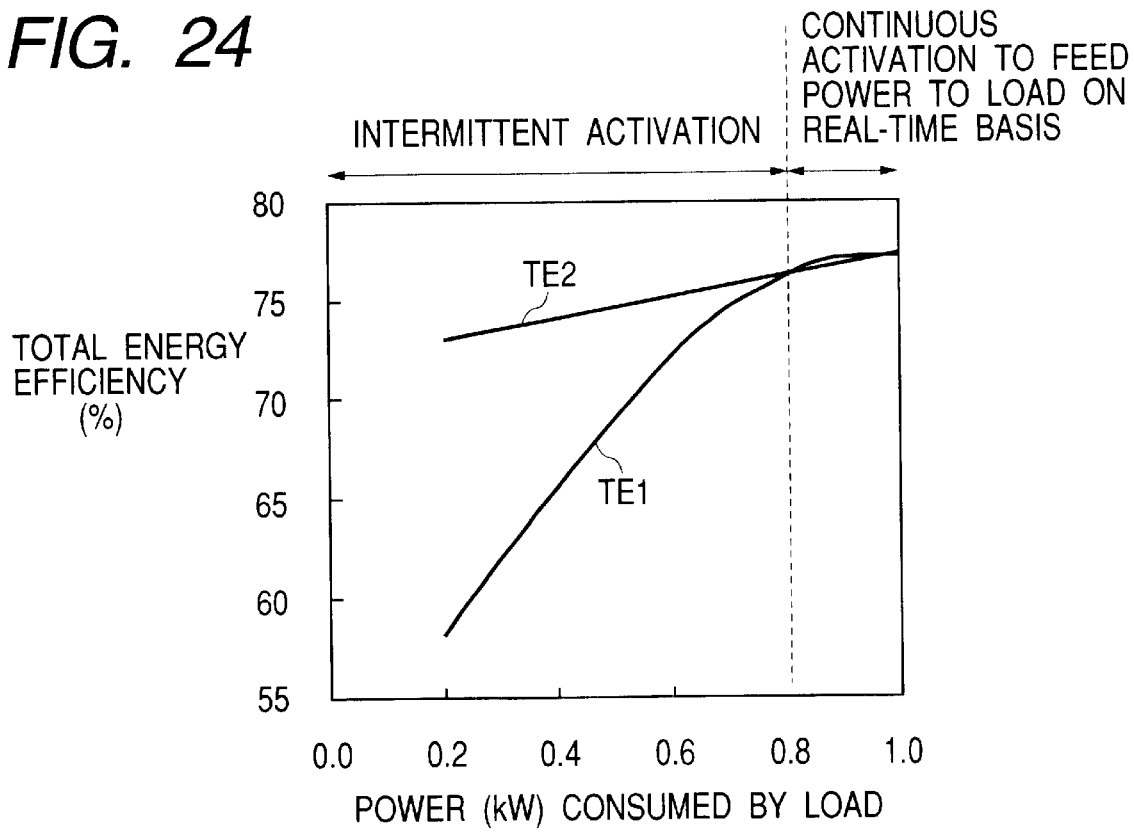
FIG. 24 is a diagram of the relation among total energy efficiencies and the power consumed by the load in the tenth specific embodiment of this invention.

Under the condition that the internal resistance of the combination battery 501 is equal to 100 mΩ and the prescribed power output (the specified power output) Pconst is equal to 1.0 kW, the total energy efficiencies TE1 and TE2 have relations with the power PL consumed by the load 502 as shown in FIG. 24. When the consumed power PL is greater than about 0.8 kW, the total energy efficiency TE1 is greater than the total energy efficiency TE2. Thus, in this case, the power generator 503 is continuously activated at a power output equal to the power consumed by the load 502. When the consumed power PL is smaller than about 0.8 kW, the total energy efficiency E1 is lower than the total energy efficiency TE2. Thus, in this case, the power generator 503 is intermittently activated.

Preferably, during vehicle operating conditions except vehicle decelerating conditions, the activation of the power generator 503 is in the intermittent mode to attain a good total energy efficiency. On the other hand, during vehicle decelerating conditions, the power generator 503 is continuously activated at the maximum power output to recover more energy and thus enhance fuel economy. As previously mentioned, the controller 508 determines whether or not the vehicle is decelerating on the basis of the output signal from the vehicle speed sensor 514A. Also, the controller 508 determines whether or not the vehicle is required to be decelerated (braked) on the basis of the output signal from the brake-pedal position sensor. When the vehicle is decelerating or when the vehicle is required to be decelerated, the controller 508 enables the power generator 503 to be continuously operated at the maximum power output. In other cases, the controller 508 sets the activation of the power generator 503 in the intermittent mode to attain a good total energy efficiency.

The controller 508 calculates the state of charge (SOC) of the combination battery 501 in a known way. A SOC sensor may be provided to detect the SOC of the combination battery 501. In this case, the controller 508 derives the SOC of the combination battery 501 from the output signal of the SOC sensor. The controller 508 calculates acceleration of the vehicle on the basis of the output signal from the vehicle speed sensor 514A. During the intermittent activation of the power generator 503, the controller 508 changes the power generator 503 between its ON state and its OFF state in response to the SOC of the combination battery 501 and the acceleration of the vehicle.

Figure 25:
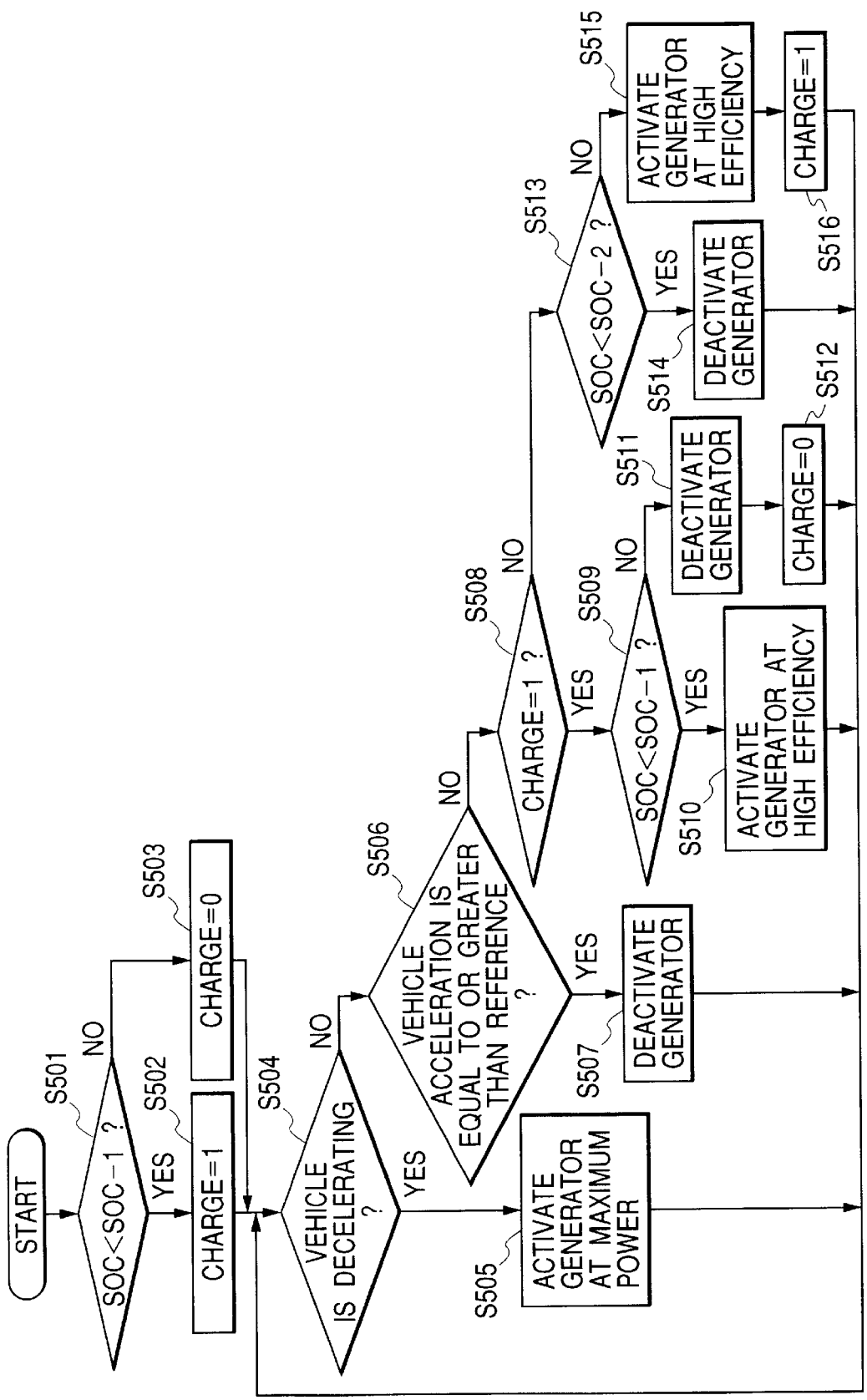
FIG. 25 is a flowchart of a segment of a program for a controller in FIG. 19.

FIG. 25 is a flowchart of a segment of a program for the controller 508. As shown in FIG. 25, a first step S501 of the program segment derives the current SOC of the combination battery 501. The step S501 compares the current SOC with a first prescribed value SOC-1 equal to, for example, 60%. When the current SOC is smaller than the first prescribed value SOC-1, the program advances from the step S501 to a step S502. Otherwise, the program advances from the step S501 to a step S503.

The step S502 sets a flag "Charge" to "1". After the step S502, the program advances to a step S504. On the other hand, the step S503 sets the flag "Charge" to "0". After the step S503, the program advances to the step S504.

The step S504 calculates the current acceleration of the vehicle on the basis of the output signal from the vehicle speed sensor 514A. The step S504 determines whether or not the vehicle is decelerating by referring to the calculated current acceleration of the vehicle. When the vehicle is decelerating, the program advances from the step S504 to a step S505. Otherwise, the program advances from the step S504 to a step S506.

The step S505 operates the power generator 503 at the maximum power output which depends on the power-generator speed (see FIG. 21). After the step S505, the program returns to the step S504.

The step S506 calculates the current acceleration of the vehicle on the basis of the output signal from the vehicle speed sensor 514A. The step S506 compares the calculated current acceleration with a predetermined reference value equal to, for example, 0.5 m/s$^2$. When the calculated current acceleration is equal to or greater than the predetermined reference value, the program advances from the step S506 to a step S507. Otherwise, the program advances from the step S506 to a step S508.

The step S507 deactivates the power generator 503. After the step S507, the program returns to the step S504.

The step S508 determines whether or not the flag "Charge" is "1". When the flag "Charge" is "1", the program advances from the step S508 to a step S509. Otherwise, the program advances from the step S508 to a step S513.

The step S509 derives the current SOC of the combination battery 501. The step S509 compares the current SOC with the first prescribed value SOC-1. When the current SOC is smaller than the first prescribed value SOC-1, the program advances from the step S509 to a step S510. Otherwise, the program advances from the step S509 to a step S511.

The step S510 operates the power generator 503 at a specified power output (for example, 1.0 kW) corresponding to the maximum power generation efficiency. After the step S510, the program returns to the step S504.

Preferably, the ROM within the controller 508 is loaded with table data representing a predetermined relation among the power-generator speed, the power generation efficiency of the power generator 503, and the power output thereof. The step S510 derives the current power-generator speed from the output signal of the power-generator speed sensor 515A. The step S510 accesses the table data in response to the current power-generator speed, and thereby determines the power output of the power generator 503 which corresponds to the maximum power generation efficiency thereof. The step S510 operates the power generator 503 at the determined power output.

The step S511 deactivates the power generator 503. A step S512 following the step S511 sets the flag "Charge" to "0". After the step S512, the program returns to the step S504.

The step S513 derives the current SOC of the combination battery 501. The step S513 compares the current SOC with a second prescribed value SOC-2 smaller than the first prescribed value SOC-1. The second prescribed value SOC-2 is equal to, for example, 50%. When the current SOC is greater than the second prescribed value SOC-2, the program advances from the step S513 to a step S514. Otherwise, the program advances from the step S513 to a step S515.

The step S514 deactivates the power generator 503. After the step S514, the program returns to the step S504.

The step S515 operates the power generator 503 at a specified power output (for example, 1.0 kW) corresponding to the maximum power generation efficiency. The step S515 is similar to the step S510.

A step S516 following the step S515 sets the flag "Charge" to "1". After the step S516, the program returns to the step S504.

Figure 26:
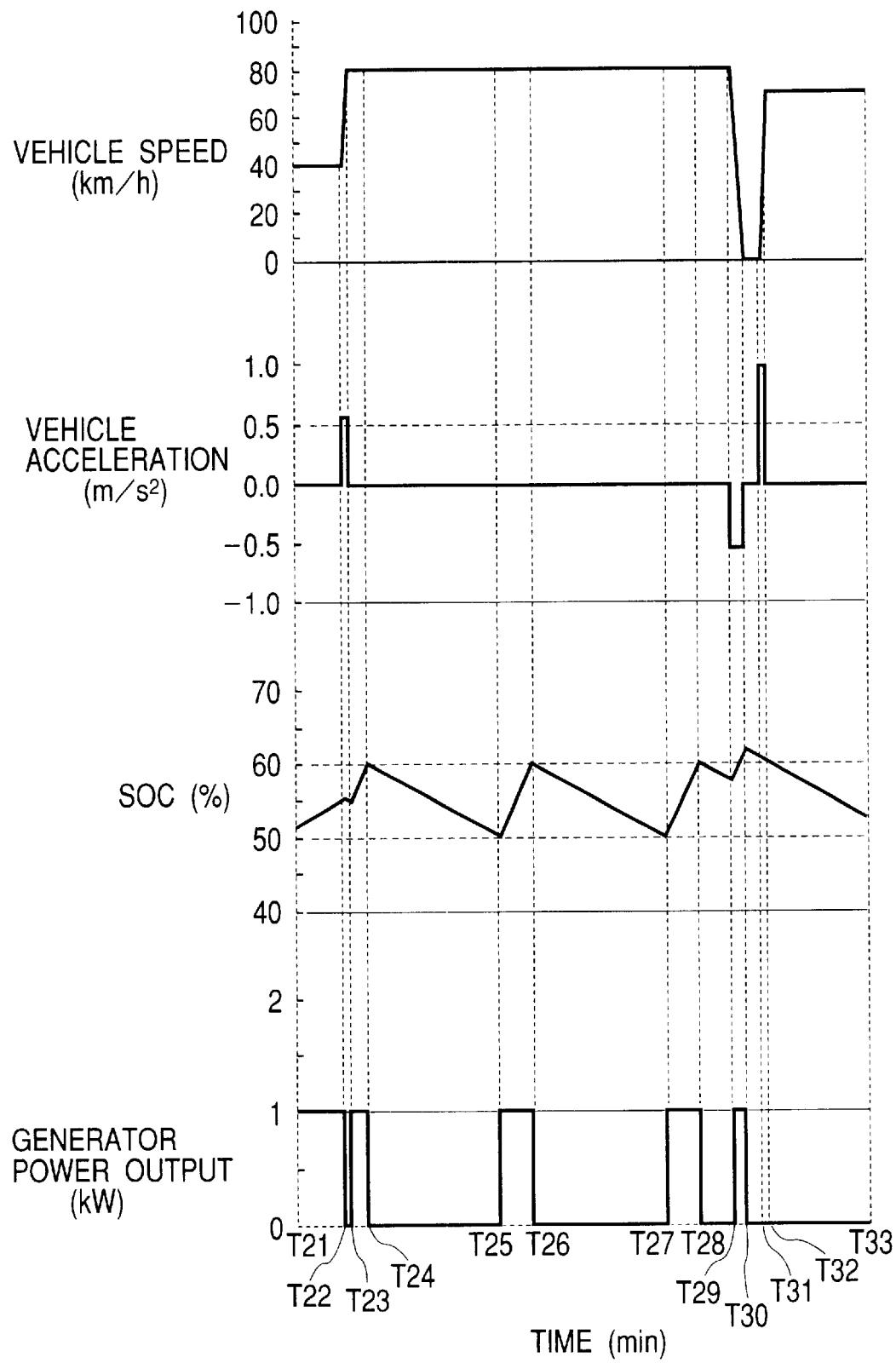
FIG. 26 is a time-domain diagram of the speed of a vehicle, the acceleration of the vehicle, the SOC of the combination battery in FIG. 19, and the power output from the power generator in FIG. 19.

With reference to FIG. 26, it is assumed that the flag "Charge" is "1" at a time point T21. During the time interval between the time point T21 and a subsequent time point T22, the vehicle speed remains equal to 40 km/h and the vehicle acceleration continues to be equal to 0 m/s$^2$. In addition, the flag "Charge" is "1", and the SOC of the combination battery 501 is smaller than the first prescribed value SOC-1 (60%). Thus, during the time interval between the time points T21 and T22, the step S510 in FIG. 25 operates the power generator 503 at the specified power output (1.0 kW) corresponding to the maximum power generation efficiency. In this case, 0.2 kW is fed to the load 502 while 0.8 kW is used to charge the combination battery 501. As a result, the SOC of the combination battery 501 increases.

During the time interval between the time point T22 and a subsequent time point T23, the vehicle speed rises from 40 km/h to 80 km/h and the vehicle acceleration continues to be equal to 0.56 m/s$^2$. Since the vehicle acceleration is greater than the predetermined reference value (0.5 m/s$^2$), the step S507 in FIG. 25 deactivates the power generator 503. In this case, the combination battery 501 feeds 0.2 kW to the load 502. As a result, the SOC of the combination battery 501 decreases.

During the time interval between the time point T23 and a subsequent time point T24, the vehicle speed remains equal to 80 km/h and the vehicle acceleration continues to be equal to 0 m/s$^2$. In addition, the flag "Charge" is "1", and the SOC of the combination battery 501 is smaller than the first prescribed value SOC-1 (60%). Thus, during the time interval between the time points T23 and T24, the step S510 in FIG. 25 operates the power generator 503 at the specified power output (1.0 kW) corresponding to the maximum power generation efficiency. In this case, 0.2 kW is fed to the load 502 while 0.8 kW is used to charge the combination battery 501. As a result, the SOC of the combination battery 501 increases.

At the time point T24, the SOC of the combination battery 501 reaches the first prescribed value SOC-1 (60%). Therefore, the step S511 in FIG. 25 deactivates the power generator 503. Then, the step S512 in FIG. 25 sets the flag "Charge" to "0".

During the time interval between the time point T24 and a subsequent time point T25, the vehicle speed remains equal to 80 km/h and the vehicle acceleration continues to be equal to 0 m/s$^2$. In addition, the flag "Charge" is "0", and the SOC of the combination battery 501 is greater than the second prescribed value SOC-2 (50%). Thus, during the time interval between the time points T24 and T25, the step S514 in FIG. 25 deactivates the power generator 503. In this case, the combination battery 501 feeds 0.2 kW to the load 502. As a result, the SOC of the combination battery 501 decreases.

At the time point T25, the SOC of the combination battery 501 reaches the second prescribed value SOC-2 (50%). Therefore, the step S515 in FIG. 25 operates the power generator 503 at the specified power output (1.0 kW) corresponding to the maximum power generation efficiency. Then, the step S516 in FIG. 25 sets the flag "Charge" to "1".

During the time interval between the time point T25 and a subsequent time point T26, the vehicle speed remains equal to 80 km/h and the vehicle acceleration continues to be equal to 0 m/s$^2$. In addition, the flag "Charge" is "1", and the SOC of the combination battery 501 is smaller than the first prescribed value SOC-1 (60%). Thus, during the time interval between the time points T25 and T26, the step S510 in FIG. 25 operates the power generator 503 at the specified power output (1.0 kW) corresponding to the maximum power generation efficiency. In this case, 0.2 kW is fed to the load 502 while 0.8 kW is used to charge the combination battery 501. As a result, the SOC of the combination battery 501 increases.

At the time point T26, the SOC of the combination battery 501 reaches the first prescribed value SOC-1 (60%). Therefore, the step S511 in FIG. 25 deactivates the power generator 503. Then, the step S512 in FIG. 25 sets the flag "Charge" to "0".

During the time interval between the time point T26 and a subsequent time point T27, the vehicle speed remains equal to 80 km/h and the vehicle acceleration continues to be equal to 0 m/s$^2$. In addition, the flag "Charge" is "0", and the SOC of the combination battery 501 is greater than the second prescribed value SOC-2 (50%). Thus, during the time interval between the time points T26 and T27, the step S514 in FIG. 25 deactivates the power generator 503. In this case, the combination battery 501 feeds 0.2 kW to the load 502. As a result, the SOC of the combination battery 501 decreases.

At the time point T27, the SOC of the combination battery 501 reaches the second prescribed value SOC-2 (50%). Therefore, the step S515 in FIG. 25 operates the power generator 503 at the specified power output (1.0 kW) corresponding to the maximum power generation efficiency. Then, the step S516 in FIG. 25 sets the flag "Charge" to "1".

During the time interval between the time point T27 and a subsequent time point T28, the vehicle speed remains equal to 80 km/h and the vehicle acceleration continues to be equal to 0 m/s$^2$. In addition, the flag "Charge" is "1", and the SOC of the combination battery 501 is smaller than the first prescribed value SOC-1 (60%). Thus, during the time interval between the time points T27 and T28, the step S510 in FIG. 25 operates the power generator 503 at the specified power output (1.0 kW) corresponding to the maximum power generation efficiency. In this case, 0.2 kW is fed to the load 502 while 0.8 kW is used to charge the combination battery 501. As a result, the SOC of the combination battery 501 increases.

At the time point T28, the SOC of the combination battery 501 reaches the first prescribed value SOC-1 (60%). Therefore, the step S511 in FIG. 25 deactivates the power generator 503. Then, the step S512 in FIG. 25 sets the flag "Charge" to "0".

During the time interval between the time point T28 and a subsequent time point T29, the vehicle speed remains equal to 80 km/h and the vehicle acceleration continues to be equal to 0 m/s$^2$. In addition, the flag "Charge" is "0", and the SOC of the combination battery 501 is greater than the second prescribed value SOC-2 (50%). Thus, during the time interval between the time points T28 and T29, the step S514 in FIG. 25 deactivates the power generator 503. In this case, the combination battery 501 feeds 0.2 kW to the load 502. As a result, the SOC of the combination battery 501 decreases.

During the time interval between the time point T29 and a subsequent time point T30, the vehicle speed drops from 80 km/h to 0 km/h and the vehicle continues to decelerate. Thus, during the time interval between the time points T29 and T30, the step S505 in FIG. 25 operates the power generator 503 at the maximum power output which depends on the power-generator speed (see FIG. 21). In this case, 0.2 kW is fed to the load 502 while remaining power is used to charge the combination battery 501. As a result, the SOC of the combination battery 501 increases.

During the time interval between the time point T30 and a subsequent time point T31, the vehicle speed remains equal to 0 km/h and the vehicle acceleration continues to be equal to 0 m/s$^2$. In addition, the flag "Charge" is "0", and the SOC of the combination battery 501 is greater than the second prescribed value SOC-2 (50%). Thus, during the time interval between the time points T30 and T31, the step S514 in FIG. 25 deactivates the power generator 503. In this case, the combination battery 501 feeds 0.2 kW to the load 502. As a result, the SOC of the combination battery 501 decreases.

During the time interval between the time point T31 and a subsequent time point T32, the vehicle speed rises from 0 km/h to 70 km/h and the vehicle acceleration continues to be equal to 0.97 m/s$^2$. Since the vehicle acceleration is greater than the predetermined reference value (0.5 m/s$^2$), the step S507 in FIG. 25 deactivates the power generator 503. In this case, the combination battery 501 feeds 0.2 kW to the load 502. As a result, the SOC of the combination battery 501 decreases.

At the time point T32, the acceleration of the vehicle ends. During the time interval between the time point T32 and a subsequent time point T33, the vehicle speed remains equal to 70 km/h and the vehicle acceleration continues to be equal to 0 m/s$^2$. In addition, the flag "Charge" is "0", and the SOC of the combination battery 501 is greater than the second prescribed value SOC-2 (50%). Thus, during the time interval between the time points T32 and T33, the step S514 in FIG. 25 deactivates the power generator 503. In this case, the combination battery 501 feeds 0.2 kW to the load 502. As a result, the SOC of the combination battery 501 decreases.

Eleventh Specific Embodiment

An eleventh specific embodiment of this invention is similar to the tenth specific embodiment thereof except for design changes mentioned later. In the eleventh specific embodiment of this invention, the controller 508 (see FIG. 19) changes the power generator 503 (see FIG. 19) between its ON state and its OFF state in response to the voltage across the combination battery 501 (see FIG. 19) rather than the SOC thereof. Specifically, the controller 508 deactivates the power generator 503 when the voltage across the combination battery 501 rises to a first prescribed level (for example, 39.0 V). The controller 508 restarts activation of the power generator 503 when the voltage across the combination battery 501 drops to a second prescribed level lower than the first prescribed level. The second prescribed level is equal to, for example, 35.0 V.

What is claimed is:

1. A multiple-output power supply apparatus for a vehicle, comprising:
   a lower battery block for feeding low-voltage power to a low-voltage load, the lower battery block including cells;
   at least one higher battery block connected in series with the lower battery block and cooperating with the lower battery block to feed high-voltage power to a high-voltage load, the higher battery block including cells;
   power generator means for feeding power to a combination of the lower battery block and the higher battery block;
   a DC—DC converter for transmitting power from the higher battery block to the lower battery block; and
   controller means for detecting an electric parameter of the lower battery block which relates to an average per-cell voltage in the lower battery block, for detecting an electric parameter of the higher battery block which relates to an average per-cell voltage in the higher battery block, for comparing the detected electric parameter of the lower battery block and the detected electric parameter of the higher battery block, and for controlling the DC—DC converter to equalize the average per-cell voltage in the lower battery block and the average per-cell voltage in the higher battery block in response to a result of said comparing.

2. A multiple-output power supply apparatus as recited in claim 1, further comprising:
   a first cell equalizing circuit connected with the cells in the lower battery block and equalizing voltages across the cells in the lower battery block; and
   a second cell equalizing circuit connected with the cells in the higher battery block and equalizing voltages across the cells in the higher battery block.

3. A method of controlling the multiple-output power supply apparatus of claim 2, comprising the steps of:
   waiting until operation of the first cell equalizing circuit and operation of the second cell equalizing circuit are completed; and
   operating the DC—DC converter under a condition that operation of the first cell equalizing circuit and operation of the second cell equalizing circuit have been completed.

4. A method of controlling the multiple-output power supply apparatus of claim 1, comprising the steps of:
   detecting a first general parameter relating to one of (1) a SOC of the lower battery block, (2) the average per-cell voltage in the lower battery block, and (3) a current fed from the lower battery block to the low-voltage load;
   detecting a second general parameter relating to one of (1) a SOC of the higher battery block, (2) the average per-cell voltage in the higher battery block, and (3) a current fed from the higher battery block to the high-voltage load;
   operating the DC—DC converter in cases where the detected first general parameter is smaller than the detected second general parameter by greater than a first threshold value; and
   maintaining operation of the DC—DC converter during a prescribed time interval after a difference between the detected first general parameter and the detected second general parameter becomes less than the first threshold value, or maintaining operation of the DC—DC converter until the difference between the detected first general parameter and the detected second general parameter becomes less than a second threshold value smaller than the first threshold value.

5. A method of controlling the multiple-output power supply apparatus of claim 1, comprising the steps of:
   detecting a first general parameter relating to one of (1) a SOC of the lower battery block, (2) the average per-cell voltage in the lower battery block, and (3) a current fed from the lower battery block to the low-voltage load;
   detecting a second general parameter relating to one of (1) a SOC of the higher battery block, (2) the average per-cell voltage in the higher battery block, and (3) a current fed from the higher battery block to the high-voltage load; and
   intermittently activating the DC—DC converter in cases where the detected first general parameter is smaller than the detected second general parameter by greater than a prescribed threshold value.

6. A method as recited in claim 5, further comprising the step of continuously activating the DC—DC converter in cases where the detected first general parameter is smaller than the detected second general parameter by greater than a given threshold value, the given threshold value being greater than the prescribed threshold value.

7. A method of controlling the multiple-output power supply apparatus of claim 1, comprising the steps of:
   calculating a first apparatus operation efficiency which occurs if the DC—DC converter is continuously activated;
   calculating a second apparatus operation efficiency which occurs if the DC—DC converter is intermittently activated; and
   intermittently activating the DC—DC converter in cases where the calculated second apparatus operation efficiency is higher than the calculated first apparatus operation efficiency.

8. A method of controlling the multiple-output power supply apparatus of claim 1, comprising the steps of:
   determining whether or not a vehicle engine ignition switch is in its OFF position; and
   operating the DC—DC converter for every prescribed time interval per prescribed term in cases where the vehicle engine ignition switch continues to be in its OFF position.

9. A method of controlling the multiple-output power supply apparatus of claim 1, comprising the steps of:
   determining whether or not a speed of the vehicle is lower than a preset speed;
   setting a power output from the DC—DC converter to a first power level when the speed of the vehicle is lower than the preset speed; and
   setting the power output from the DC—DC converter to a second power level when the speed of the vehicle is not lower than the preset speed, the second power level being greater than the first power level.

10. An apparatus for controlling a vehicular power generator, comprising:
    power storage means;
    a power generator for feeding power to the power storage means and an electric load; and
    controlling means for intermittently activating the power generator to approximately equalize an average power output from the power generator to a power consumed by the electric load.

11. An apparatus as recited in claim 10, further comprising means for detecting a rotational speed of a drive shaft of the power generator, and means for, during the intermittent activation of the power generator, controlling the power generator in response to the detected rotational speed of the drive shaft of the power generator on the basis of a predetermined relation among the rotational speed of the drive shaft of the power generator, a power generation efficiency of the power generator, and a power output from the power generator to provide an instantaneous power output corresponding to a high power generation efficiency.

12. An apparatus as recited in claim 10, wherein the controlling means comprises first sub-means for calculating a first total energy efficiency which occurs if the power generator is intermittently activated, second sub-means for calculating a second total energy efficiency which occurs if the power generator is continuously activated, third sub-means for intermittently activating the power generator when the first total energy efficiency is higher than the second total energy efficiency, and fourth sub-means for continuously activating the power generator when the second total energy efficiency is higher than the first total energy efficiency.

13. An apparatus as recited in claim 12, wherein the controlling means comprises means for calculating the first and second total energy efficiencies from a power generation efficiency of the power generator and charging and discharging efficiencies of the power storage means.

14. An apparatus as recited in claim 10, wherein the controlling means comprises first sub-means for determining whether or not a vehicle is decelerating, second sub-means for operating the power generator at a maximum power output when the first sub-means determines that the vehicle is decelerating, and third sub-means for intermittently activating the power generator when the first sub-means determines that the vehicle is not decelerating.

15. An apparatus as recited in claim 10, wherein the controlling means comprises first sub-means for detecting an acceleration of a vehicle, and second sub-means for deactivating the power generator when the detected acceleration of the vehicle exceeds a prescribed value.

16. An apparatus as recited in claim 10, further comprising means for detecting a parameter relating to one of (1) a SOC of the power storage means and (2) a voltage across the power storage means, means for, during the intermittent activation of the power generator, continuously operating the power generator at a specified power output until the detected parameter rises to a first prescribed value, and means for, during the intermittent activation of the power generator, continuously deactivating the power generator until the detected parameter drops to a second prescribed value lower than the first prescribed value.

17. An apparatus as recited in claim 10, wherein the power storage means comprises a lithium battery.

18. An apparatus as recited in claim 10, wherein the power storage means comprises an electric double layer capacitor.

\* \* \* \* \*